US010343854B2

(12) United States Patent
Kunihiro et al.

(10) Patent No.: US 10,343,854 B2
(45) Date of Patent: Jul. 9, 2019

(54) PALLET DEVICE, MACHINE TOOL AND MACHINING SYSTEM WHICH CLAMP WORKPIECE

(71) Applicant: FANUC CORPORATION, Yamanashi (JP)

(72) Inventors: Keisuke Kunihiro, Yamanashi (JP); Naoki Akagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/659,713

(22) Filed: Jul. 26, 2017

(65) Prior Publication Data

US 2018/0057278 A1    Mar. 1, 2018

(30) Foreign Application Priority Data

Aug. 30, 2016   (JP) .................................. 2016-167974

(51) Int. Cl.
*B23Q 3/08*        (2006.01)
*B23Q 7/04*        (2006.01)
(Continued)

(52) U.S. Cl.
CPC ........... *B65G 47/90* (2013.01); *B23Q 1/0072* (2013.01); *B23Q 3/06* (2013.01); *B23Q 3/082* (2013.01); *B23Q 7/04* (2013.01); *B23Q 7/1426* (2013.01); *B23Q 7/1494* (2013.01); *B25B 5/061* (2013.01); *B65D 19/38* (2013.01); *B25B 5/163* (2013.01); *B25J 15/08* (2013.01);
(Continued)

(58) Field of Classification Search
CPC ...... B65D 2519/00786; B23Q 7/1426–7/1494; Y10T 29/5196; Y10T 29/5124

USPC ...... 29/33 P, 563; 269/309; 198/345.3, 346.1
See application file for complete search history.

(56) References Cited

U.S. PATENT DOCUMENTS

| 4,312,110 | A | * | 1/1982 | Averyanov | ........... | B23Q 7/1431 |
| | | | | | | 198/346.1 |
| 5,018,617 | A | * | 5/1991 | Miyata | ................. | B23Q 7/1431 |
| | | | | | | 198/346.1 |

(Continued)

FOREIGN PATENT DOCUMENTS

CH       658615 A5 * 11/1986
FR     2513162 A1     3/1983
(Continued)

OTHER PUBLICATIONS

Machine Translation CH 658615, which CH '615 was published Nov. 1986.*

(Continued)

*Primary Examiner* — Erica E Cadugan
(74) *Attorney, Agent, or Firm* — Fredrikson & Byron, P.A.

(57) ABSTRACT

A pallet device which can prevent a hook fixed to a pallet from interfering with a workpiece or a tool for a machine tool. The pallet device includes a pallet including a pallet main body which clamps a workpiece, and a replacement hook movably provided in the pallet main body, the replacement hook being movable between a projection position at which the replacement hook projects outside the pallet main body and a retraction position to which the replacement hook is retracted from the projection position to the pallet main body, and a jig to and from which the pallet is attached and detached.

10 Claims, 20 Drawing Sheets

(51) Int. Cl.
  *B23Q 7/14* (2006.01)
  *B65D 19/38* (2006.01)
  *B65G 47/90* (2006.01)
  *B25J 15/08* (2006.01)
  *B25B 5/00* (2006.01)
  *B23Q 1/00* (2006.01)
  *B25B 5/06* (2006.01)
  *B23Q 3/06* (2006.01)
  *B25B 5/16* (2006.01)

(52) U.S. Cl.
  CPC .............. *B65D 2519/00786* (2013.01); *B65G 2201/0267* (2013.01); *B65G 2203/0283* (2013.01); *Y10T 29/5196* (2015.01)

(56) References Cited

U.S. PATENT DOCUMENTS

| | | | | |
|---|---|---|---|---|
| 5,052,735 A * | 10/1991 | Kuse | .................... | B23Q 7/1494 |
| | | | | 294/81.5 |
| 5,065,991 A * | 11/1991 | Schneider | ............ | B23Q 7/1426 |
| | | | | 269/309 |
| 5,630,577 A * | 5/1997 | Tankersley | ............ | B23Q 3/067 |
| | | | | 269/309 |
| 5,788,225 A * | 8/1998 | Iwata | .................... | B23Q 3/103 |
| | | | | 269/309 |
| 6,073,325 A * | 6/2000 | Stark | .................... | B23Q 1/0072 |
| | | | | 198/345.3 |
| 6,089,557 A * | 7/2000 | Obrist | .................... | B23Q 1/0081 |
| | | | | 269/309 |
| 6,527,266 B1 * | 3/2003 | Yonezawa | ............ | B23Q 1/0081 |
| | | | | 269/309 |
| 7,146,705 B2 * | 12/2006 | Ahti | .................... | B23Q 3/103 |
| | | | | 29/563 |
| 8,307,522 B2 * | 11/2012 | Kobayashi | ............ | B23Q 1/0072 |
| | | | | 269/309 |
| 2002/0175042 A1 * | 11/2002 | Nishii | .................... | B23Q 7/1431 |
| | | | | 198/346.1 |
| 2014/0178144 A1 | 6/2014 | Nakano et al. | | |

FOREIGN PATENT DOCUMENTS

| | | |
|---|---|---|
| JP | 61172749 U | 10/1986 |
| JP | S63-050641 U | 4/1988 |
| JP | 881019 A | 3/1996 |
| JP | 2001-038564 A | 2/2001 |
| WO | 2013/186915 A1 | 12/2013 |

OTHER PUBLICATIONS

English Machine Translation of Japanese Publication No. JPS61-172749 U1, published Oct. 27, 1986, 2 pgs.
English Abstract and Machine Translation for Japanese Publication No. 08-081019 A, published Mar. 26, 1996, 9 pgs.
English Machine Translation for Japanese Publication No. S63-050641 U, published Apr. 6, 1988, 2 pages.
English Abstract and Machine Translation for Japanese Publication No. 2001-038564 A, published Feb. 13, 2001, 12 pages.
English Abstract and Machine Translation for French Publication No. 2513162 A1, published Mar. 25, 1983, 8 pages.

* cited by examiner

FIG. 20
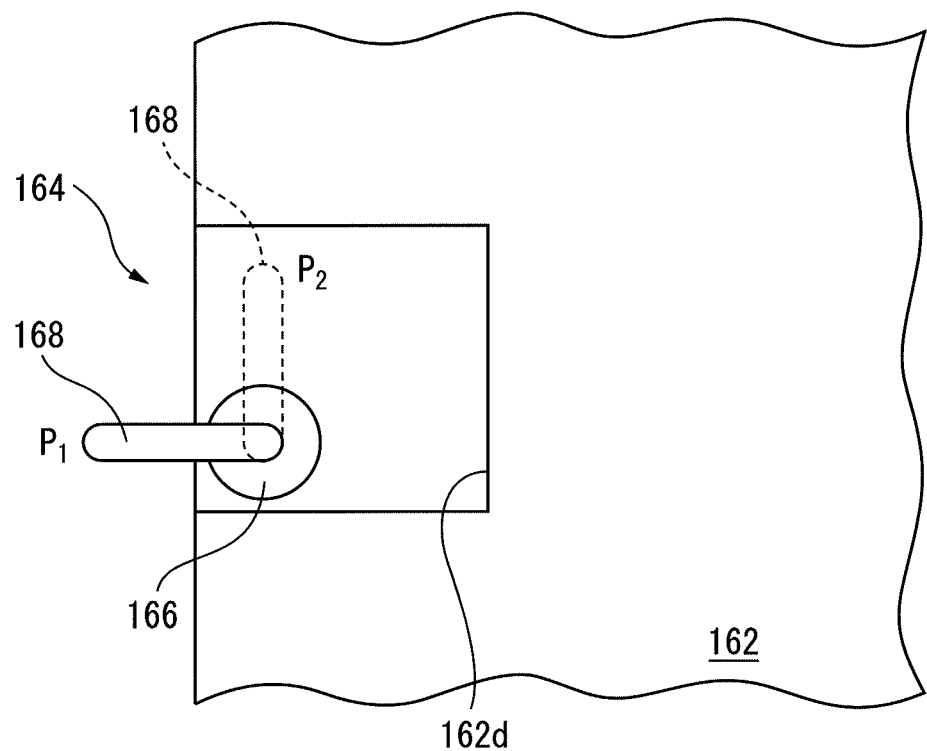
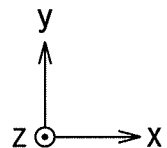

PALLET DEVICE, MACHINE TOOL AND MACHINING SYSTEM WHICH CLAMP WORKPIECE

BACKGROUND OF THE INVENTION

1. Field of the Invention

The invention relates to a pallet device which clamps a workpiece, a machine tool, and a machining system.

2. Description of the Related Art

In machine tools, pallet devices which clamp a workpiece to machine the workpiece are known (e.g., Japanese Unexamined Patent Publication (Kokai) No. H08-081019).

Hooks are fixed to pallets provided in the above-mentioned pallet devices. The hooks are portions gripped by a machine such as a robot in replacing the pallets. As a conventional problem, the hooks interfere with workpieces or tools for machine tools.

SUMMARY OF THE INVENTION

In an aspect of the invention, a pallet device of a machine tool includes a pallet including a pallet main body configured to clamp a workpiece, and a replacement hook movably provided at the pallet main body, the replacement hook being movable between a projection position where the replacement hook projects out from the pallet main body and a retraction position where the replacement hook is retracted from the projection position toward the pallet main body; and a jig to and from which the pallet is attached and detached.

The pallet may further include a biasing section configured to bias the replacement hook toward the retraction position. The pallet may further include a driving section configured to move the replacement hook to the projection position. The driving section may include a cylinder configured to movably receive the replacement hook and move the replacement hook to the projection position by a pressure of a fluid supplied thereinto from a fluid supply section.

The jig may include a pallet clamp configured to releasably clamp the pallet. The pallet clamp may include a shaft inserted into a hole formed at the pallet main body, and an engagement section provided at the shaft so as to be movable between a second projection position where the engagement section projects out from the shaft and a second retraction position where the engagement section is accommodated in the shaft.

The engagement section engages a wall surface of the hole so as to clamp the pallet when the shaft is inserted into the hole and the engagement section is arranged at the second projection position. The pallet clamp may further include a second cylinder configured to move the engagement section to the second retraction position by a pressure of a fluid supplied thereinto from the fluid supply section.

The pallet device may further include a position maintaining section configured to maintain a position of the replacement hook when the replacement hook is arranged at the projection position. The position maintaining section may include a movement restriction section movable between an engagement position where the movement restriction section engages the replacement hook arranged at the projection position so as to restrict the movement of the replacement hook toward the retraction position and a disengagement position where the movement restriction section disengages from the replacement hook so as to allow the movement of the replacement hook toward the retraction position.

The position maintaining section may further include a second biasing section configured to bias the movement restriction section toward the disengagement position, and a second driving section configured to move the movement restriction section to the engagement position. The position maintaining section may include a valve configured to restrict a fluid flow from the cylinder to the fluid supply section when the replacement hook is moved to the projection position.

In another aspect of the invention, a machine tool includes the above-mentioned pallet device. In still another aspect of the invention, a machining system includes the above-mentioned machine tool and a machine configured to detach the pallet from the jig, the machine including a holding section able to hold the replacement hook arranged at the projection position. The machine may be a robot or a loader.

BRIEF DESCRIPTION OF THE DRAWINGS

The above-mentioned or other objects, features, and advantages of the invention will be clarified from the following description of embodiments with reference to the accompanying drawings, in which:

FIG. 20 is a cross-sectional view of the pallet illustrated in FIG. 19 cut along an x-y plane in FIG. 19.

DETAILED DESCRIPTION

Figure 1:
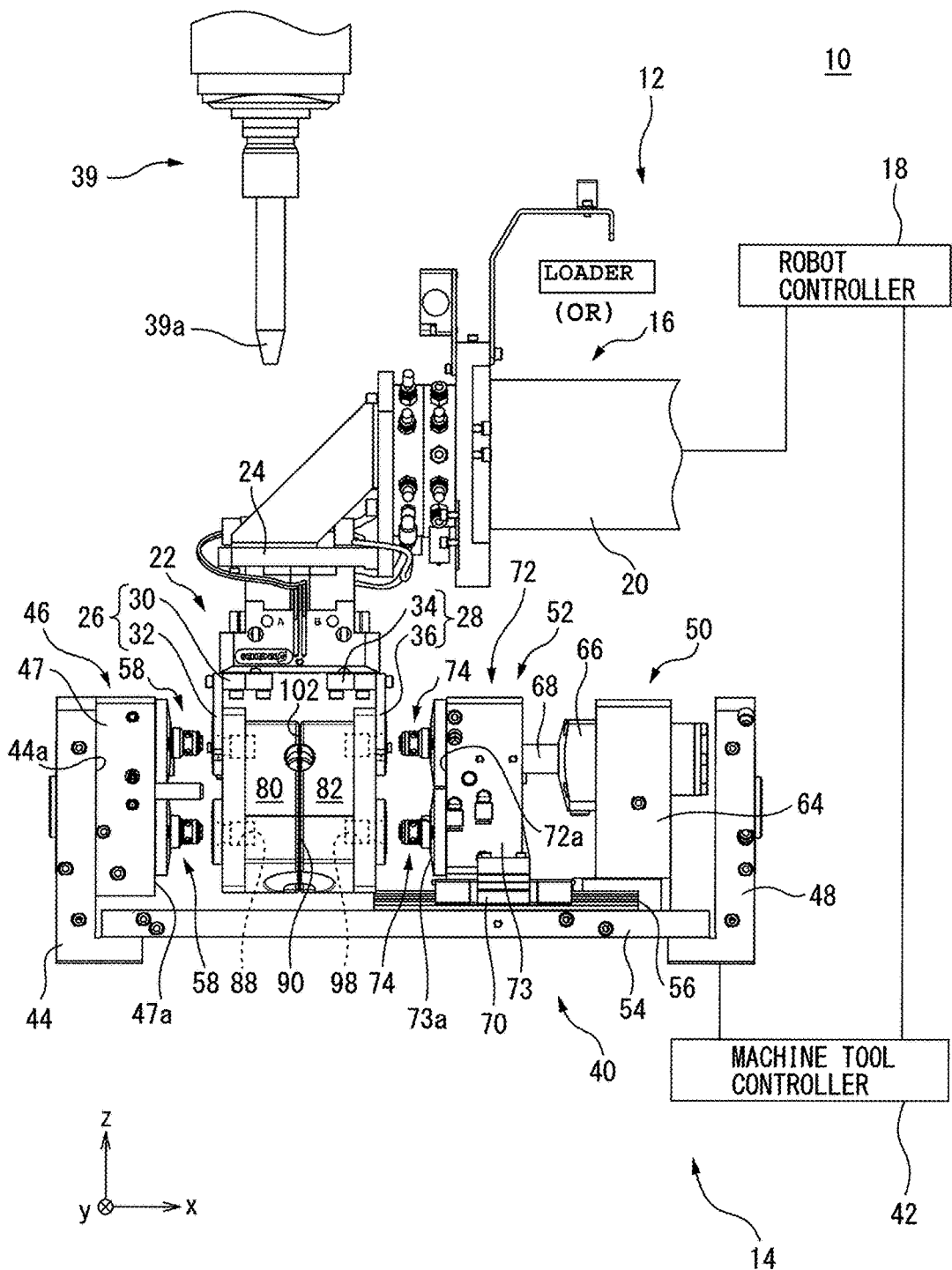
FIG. 1 is a view of a machining system according to an embodiment.

Embodiments of the invention will be described in detail below with reference to the drawings. First, a machining system 10 according to an embodiment of the invention will be described with reference to FIGS. 1 to 12.

Note that, in the following description, an orthogonal coordinate system in the drawings is used as a standard for directions, and x-axis plus direction is referred to as the rightward direction, y-axis plus direction is referred to as the frontward direction, and z-axis plus direction is referred to as the upward direction, for the sake of convenience. Further, in various embodiments described below, similar elements are assigned the same reference numerals, and repetitive descriptions thereof will be omitted.

The machining system 10 includes a robot system 12 and a machine tool 14. The robot system 12 includes a robot 16 and a robot controller 18. The robot controller 18 includes e.g. a CPU and a memory, and directly or indirectly controls each component of the robot 16.

The robot 16 includes a manipulator 20 and a robot hand 22. The manipulator 20 includes a servomotor (not illustrated) built therein, and moves the robot hand 22.

The robot hand 22 includes a hand base 24, fingers 26 and 28 provided at the hand base 24 so as to open and close, and a finger driving section (not illustrated) which generates power for opening and closing the fingers 26 and 28. The finger driving section includes e.g. a servomotor or a pneumatic or hydraulic cylinder (not illustrated).

The finger 26 includes a proximal end 30 coupled to the hand base 24, and two fingertips 32 bifurcated from the proximal end 30 and extending downward from the proximal end 30. A through hole (not illustrated) is formed at the distal end of each fingertip 32.

The finger 28 is arranged at right side of the finger 26. The finger 28 includes a proximal end 34 coupled to the hand base 24, and two fingertips 36 bifurcated from the proximal end 34 and extending downward from the proximal end 34. A through hole (not illustrated) is formed at the distal end of each fingertip 36.

The robot controller 18 sends a command to each servomotor built in the manipulator 20 so as to operate the manipulator 20. Further, the robot controller 18 sends a command to the finger driving section provided in the robot hand 22 so as to open and close the fingers 26 and 28.

The machine tool 14 includes a spindle 39, a pallet device 40, and a machine tool controller 42. The machine tool controller 42 includes e.g. a CPU and a memory, and directly or indirectly controls each component of the machine tool 14. The robot controller 18 and the machine tool controller 42 are communicatively connected to each other, and carry out pallet attachment and detachment operations described later while communicating with each other.

The spindle 39 includes a servomotor (not illustrated) built therein, and is moved in the z-axis direction in accordance with a command from the machine tool controller 42. A tool 39a is attached to the tip of the spindle 39. The spindle 39 rotates the tool 39a in accordance with a command from the machine tool controller 42 so as to machine a workpiece by the tool 39a.

Figure 2:
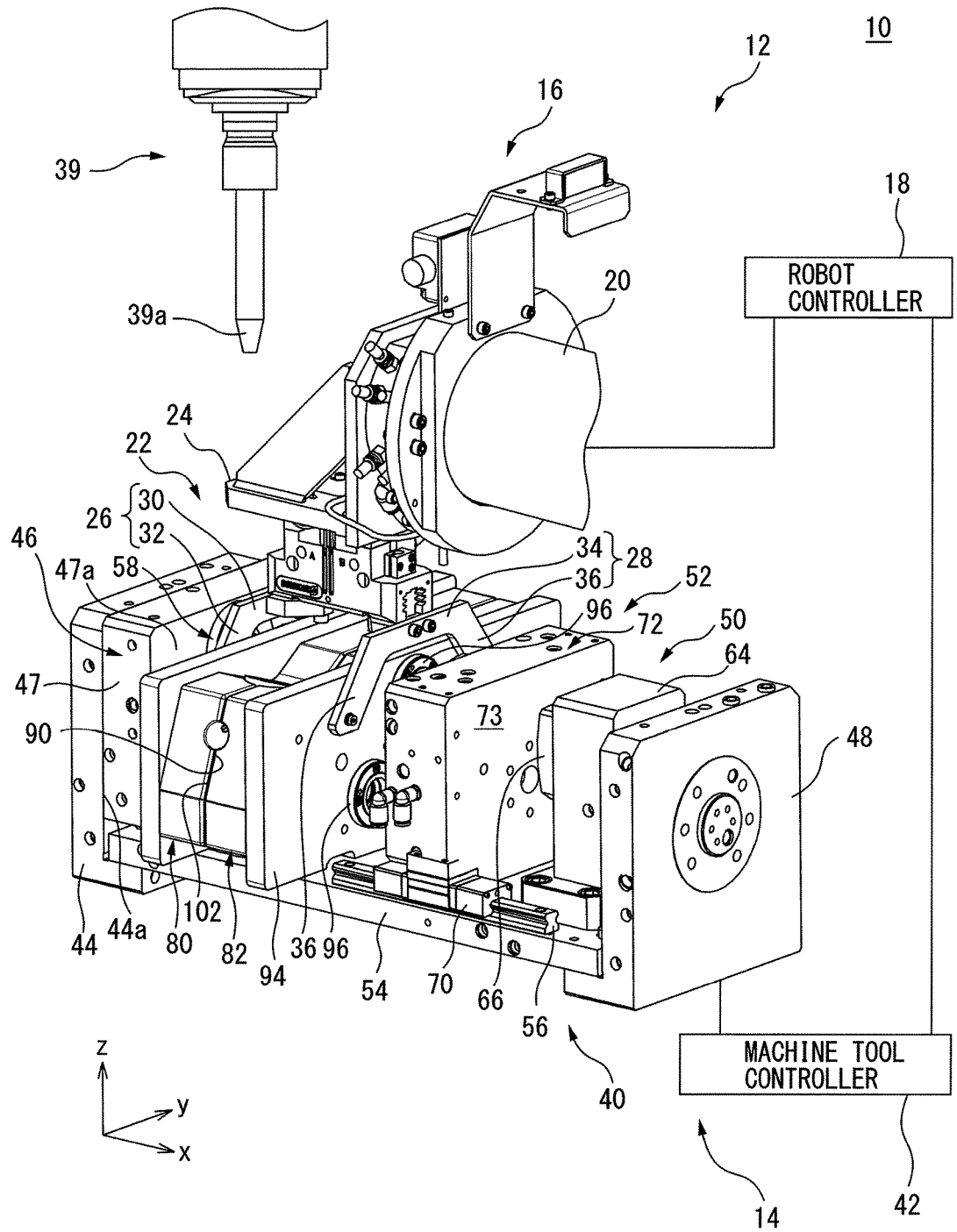
FIG. 2 is a perspective view of the machining system illustrated in FIG. 1.
Figure 3:
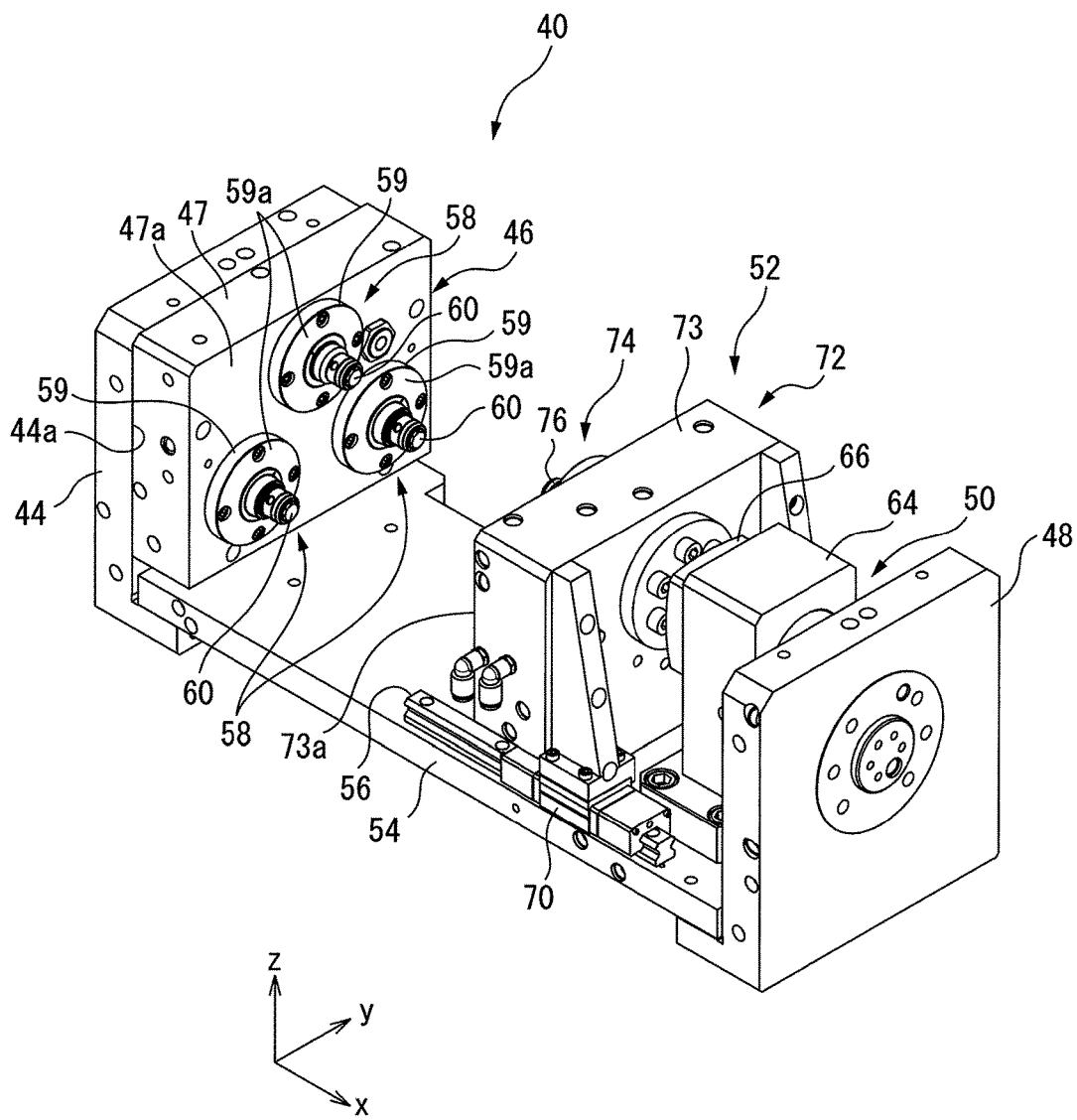
FIG. 3 is a perspective view of a part of the machining system illustrated in FIG. 1.

As illustrated in FIGS. 1, 2, and 3, the pallet device 40 includes a first support 44, a first jig 46, a second support 48, a jig driving section 50, and a movable section 52. The first support 44 and the second support 48 are fixed so as to be separated in the x-axis direction. A base plate 54 is fixed to the first support 44 and the second support 48.

The base plate 54 extends between the first support 44 and the second support 48. A pair of rails 56 are fixed on the base plate 54 so as to be separated in the y-axis direction. Each rail 56 linearly extends in the x-axis direction. Note that, only the rear rail 56 of the pair of rails 56 are shown in FIGS. 1 to 3.

The first jig 46 is fixed to a right end face 44a of the first support 44. The first jig 46 includes a jig main body 47 and a total of three pallet clamps 58. The jig main body 47 is a substantially quadrangular prismatic member, and is fixed to the right end face 44a of the first support 44.

Figure 4:
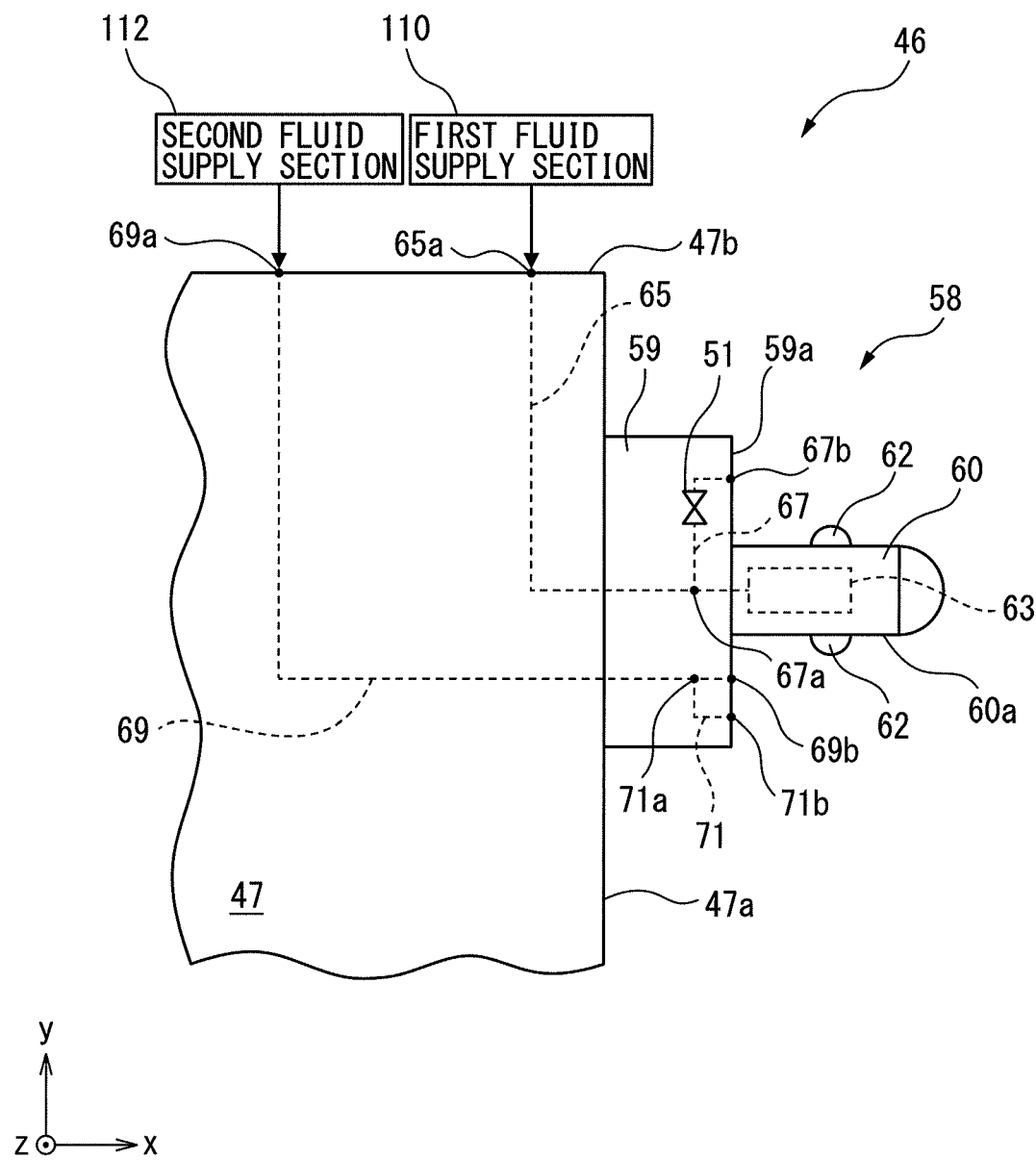
FIG. 4 is an enlarged view of a pallet clamp of the first jig illustrated in FIG. 1.

As illustrated in FIGS. 3 and 4, each pallet clamp 58 includes a boss 59, a shaft 60, engagement sections 62, and a cylinder 63 (second cylinder). The boss 59 is fixed to a right end face 47a of the jig main body 47 so as to project rightward from the right end face 47a. The shaft 60 is fixed to a right end face 59a of the boss 59 so as to project rightward from the right end face 59a.

Each engagement section 62 is accommodated in a hole (not illustrated) formed at the shaft 60 so as to be recessed inward from an outer peripheral surface 60a of the shaft 60. Each engagement section 62 is movable in the radial direction of the shaft 60 between a projection position (second projection position), at which the engagement section 62 projects out from the outer peripheral surface 60a of the shaft 60, and a retraction position (second retraction position), at which the engagement section 62 is retracted inward from the outer peripheral surface 60a of the shaft 60.

In this embodiment, the cylinder 63 is built in the shaft 60. The cylinder 63 moves each engagement section 62 to the retraction position by a pressure of a fluid supplied into the cylinder 63. More specifically, each engagement section 62 is biased toward the projection position by a biasing section (e.g., a spring) provided in the cylinder 63.

When no fluid is supplied into the cylinder 63 (i.e., the pressure $P_{63}$ in the cylinder 63 is low), each engagement section 62 is placed at the projection position by the action of the biasing section. When a fluid is supplied into the cylinder 63 so as to set the pressure $P_{63}$ in the cylinder 63 to be High, each engagement section 62 is moved to the retraction position by the pressure of the supplied fluid.

As illustrated in FIG. 4, the first jig 46 further includes fluid paths 65, 67, 69 and 71, and a solenoid valve 51. The fluid path 65 is formed in the jig main body 47, the boss 59, and the shaft 60. The fluid path 65 extends inward of the jig main body 47 from an open end 65a formed at a front end face 47b of the jig main body 47, so as to be in fluid communication with the inside of the cylinder 63.

The fluid path 67 is formed in the boss 59 so as to be in fluid communication with the fluid path 65. More specifically, the fluid path 67 is diverged from the fluid path 65 at a bifurcation 67a, and opens to the outside at an open end 67b formed at the right end face 59a of the boss 59. The solenoid valve 51 opens and closes the fluid path 67 in accordance with a command from the machine tool controller 42.

The fluid path 69 is formed in the jig main body 47 and the boss 59. The fluid path 69 extends inward of the jig main body 47 from an open end 69a formed at the front end face 47b of the jig main body 47, and opens to the outside at an open end 69b formed at the right end face 59a of the boss 59.

The fluid path 71 is formed in the boss 59 so as to be in fluid communication with the fluid path 69. More specifically, the fluid path 71 is diverged from the fluid path 69 at a bifurcation 71a, and opens to the outside at an open end 71b formed at the right end face 59a of the boss 59.

The fluid paths 65, 67, 69, and 71 may be defined by a hole formed in the jig main body 47, the boss 59, or the shaft 60, or by a pipe separated from the jig main body 47, the boss 59, or the shaft 60.

Note that, although FIG. 4 illustrates that the fluid path 65 is in fluid communication with the cylinder 63 of one pallet clamp 58 for the sake of easy understanding, the fluid path 65 is also in fluid communication with the inside of the cylinder 63 of each of the other two pallet clamps 58. Further, the fluid path 69 extends to the open end 69b formed at the right end face 59a of the boss 59 of each of the other two pallet clamps 58.

Referring again to FIGS. 1 to 3, the jig driving section 50 is a hydraulic or pneumatic cylinder. More specifically, the jig driving section 50 includes a third support 64, a cylinder main body 66 supported by the third support 64, and a cylinder shaft 68 received in the cylinder main body 66 so as to be able to advance and retract.

The third support 64 is fixed on the base plate 54. The cylinder main body 66 is a hollow member, and includes a piston (not illustrated) built therein. The piston is connected to the cylinder shaft 68, and driven in the x-axis direction in response to a pressure of a fluid (e.g., oil or compressed gas) supplied from an external device (not illustrated) into the cylinder main body 66. Thus, the cylinder shaft 68 advances and retracts in the x-axis direction.

The movable section 52 is provided on the base plate 54 so as to be movable in the x-axis direction. More specifically, the movable section 52 includes a pair of engagement sections 70 separated away from each other in the y-axis direction, and a second jig 72 fixedly provided on the engagement sections 70.

Each of the pair of engagement sections 70 slidably engages with the corresponding one of the pair of rails 56. Note that, only the rear engagement section 70 of the pair of engagement sections 70 are shown in FIGS. 1 to 3. The movable section 52 is guided to move in the x-axis direction along the rails 56 by the engagement between the engagement sections 70 and the rails 56.

The second jig 72 is fixed to the left end of the cylinder shaft 68. The second jig 72 includes a jig main body 73 and a total of three pallet clamps 74. The jig main body 73 is a substantially quadrangular prismatic member, and is fixed on the engagement sections 70.

Figure 5:
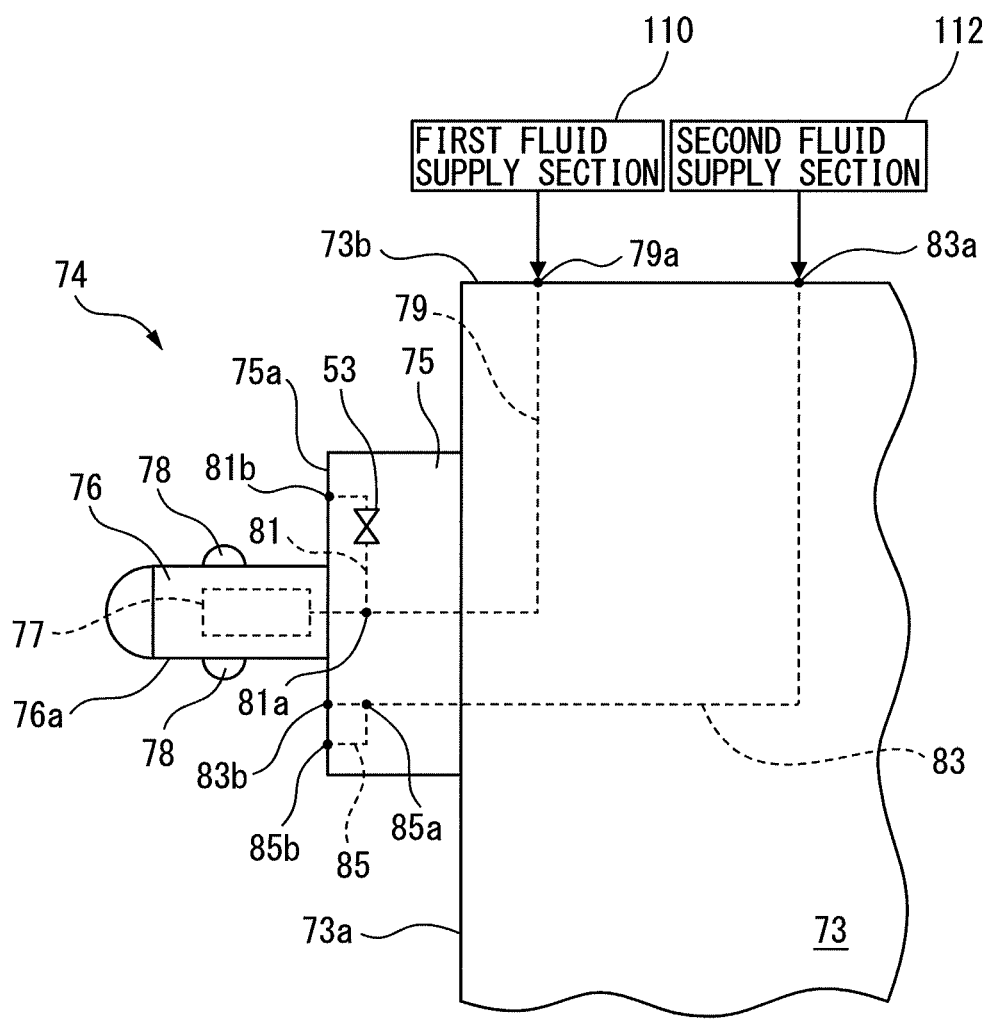
FIG. 5 is an enlarged view of a pallet clamp of the second jig illustrated in FIG. 1.

As illustrated in FIG. 5, each pallet clamp 74 includes a boss 75, a shaft 76, engagement sections 78, and a cylinder 77 (second cylinder). The boss 75 is fixed to a left end face 73a of the jig main body 73 so as to project leftward from the left end face 73a. The shaft 76 is fixed to a left end face 75a of the boss 75 so as to project leftward from the left end face 75a.

Each engagement section 78 is accommodated in a hole (not illustrated) formed at the shaft 76 so as to be recessed inward from an outer peripheral surface 76a of the shaft 76. Each engagement section 78 is movable in the radial direction of the shaft 76 between a projection position (second projection position), at which the engagement section 78 projects out from the outer peripheral surface 76a of the shaft 76, and a retraction position (second retraction position), at which the engagement section 78 is retracted inward from the outer peripheral surface 76a of the shaft 76.

In this embodiment, the cylinder 77 is built in the shaft 76. The cylinder 77 moves each engagement section 78 to the retraction position by a pressure of a fluid supplied in the cylinder 77. More specifically, each engagement section 78 is biased toward the projection position by a biasing section (e.g., a spring) provided in the cylinder 77.

When no fluid is supplied into the cylinder 77 (i.e., the pressure $P_{77}$ in the cylinder 77 is low), each engagement section 78 is placed at the projection position by the action of the biasing section. When a fluid is supplied into the cylinder 77 so as to set the pressure $P_{77}$ in the cylinder 77 to be High, each engagement section 78 is moved to the retraction position by the pressure of the supplied fluid.

The second jig 72 further includes fluid paths 79, 81, 83, and 85, and a solenoid valve 53. The fluid path 79 is formed in the jig main body 73, the boss 75, and the shaft 76. The fluid path 79 extends inward of the jig main body 73 from an open end 79a formed at a front end face 73b of the jig main body 73, so as to be in fluid communication with the inside of the cylinder 77.

The fluid path 81 is formed in the boss 75 so as to be in fluid communication with the fluid path 79. More specifically, the fluid path 81 is diverged from the fluid path 79 at a bifurcation 81a, and opens to the outside at an open end 81b formed at the left end face 75a of the boss 75. The solenoid valve 53 opens and closes the fluid path 81 in accordance with a command from the machine tool controller 42.

The fluid path 83 is formed in the jig main body 73 and the boss 75. The fluid path 83 extends inward of the jig main body 73 from an open end 83a formed at the front end face 73b of the jig main body 73, and opens to the outside at an open end 83b formed at the left end face 75a of the boss 75.

The fluid path 85 is formed in the boss 75 so as to be in fluid communication with the fluid path 83. More specifically, the fluid path 85 is diverged from the fluid path 83 at a bifurcation 85a, and opens to the outside at an open end 85b formed at the left end face 75a of the boss 75.

The fluid paths 79, 81, 83, and 85 may be defined by a hole formed in the jig main body 73, the boss 75, or the shaft 76, or by a pipe separate from the jig main body 73, the boss 75, or the shaft 76.

Note that, although FIG. 5 illustrates that the fluid path 79 is in fluid communication with the cylinder 77 of one pallet clamp 74 for the sake of easy understanding, the fluid path 79 is also in fluid communication with the inside of the cylinder 77 of each of the other two pallet clamps 74. Further, the fluid path 83 extends to the open end 83b formed at the left end face 75a of the boss 75 of each of the other two pallet clamps 74.

As illustrated in FIGS. 1 and 2, the pallet device 40 further includes a first pallet 80 and a second pallet 82. The first pallet 80 and the second pallet 82 are configured for holding a workpiece therebetween so as to clamp the workpiece.

Figure 6:
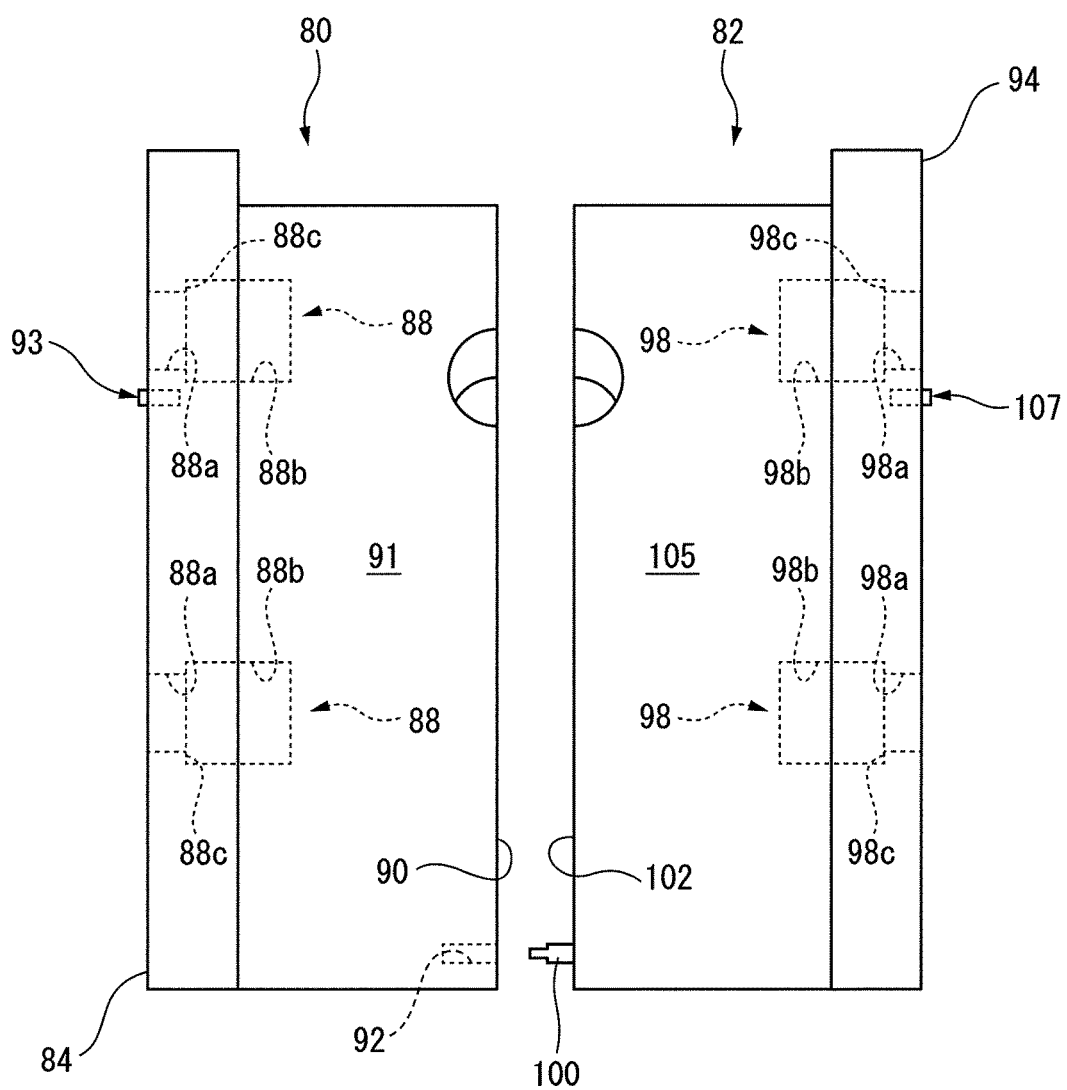
FIG. 6 is an enlarged view of the first and second pallets illustrated in FIG. 1.

In this embodiment, the first pallet 80 is attached to and detached from the first jig 46. As illustrated in FIG. 6, the first pallet 80 includes a pallet main body 91 and a total of two hook devices 93.

The pallet main body 91 is formed with a total of three holes 88 recessed rightward from a left end face 84 of the pallet main body 91. Each hole 88 has a circular outer shape, and can slidably receive the corresponding shaft 60.

More specifically, each hole 88 includes a first hole part 88a and a second hole part 88b. The second hole part 88b has a diameter larger than that of the first hole part 88a, wherein a step 88c is formed at the connection between the first hole part 88a and the second hole part 88b. A pin receiving hole 92 is formed at the first pallet 80 so as to be recessed leftward from the right end face 90 of the first pallet 80.

Figure 7:
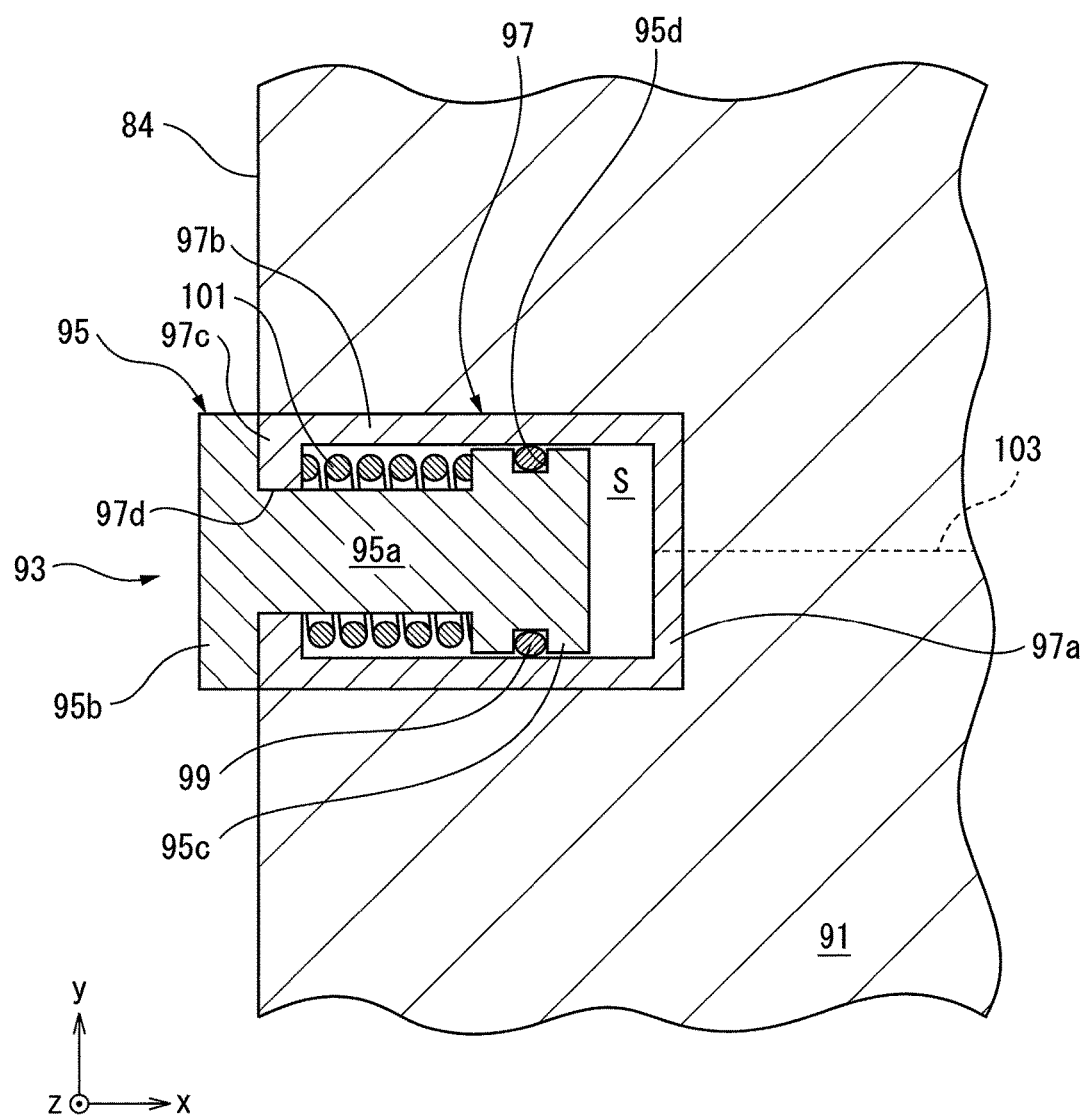
FIG. 7 is an enlarged cross-sectional view of a hook device provided in the first jig, wherein a replacement hook is arranged at a retraction position.

As illustrated in FIG. 7, each hook device 93 includes a replacement hook 95, a cylinder 97, an O-ring 99, and a biasing section 101.

The replacement hook 95 includes a shaft 95a extending along the x-axis, a first flange 95b projecting out from the left end of the shaft 95a, and a second flange 95c projecting out from the right end of the shaft 95a. The second flange 95c is formed with a groove 95d recessed inward from the outer peripheral surface of the second flange 95c.

The cylinder 97 is hollow and embedded in the pallet main body 91. The cylinder 97 includes a proximal wall 97a, a side wall 97b extending from the proximal wall 97a, and a distal wall 97c fixed to the distal end of the side wall 97b. A central hole 97d is formed at the distal wall 97c. The replacement hook 95 is received in the cylinder 97 so as to be slidable in the x-axis direction.

When the replacement hook 95 is received in the cylinder 97, the second flange 95c of the replacement hook 95 is accommodated in the cylinder 97, and the shaft 95a of the replacement hook 95 passes through the central hole 97d formed at the distal wall 97c of the cylinder 97.

The first flange 95b of the replacement hook 95 is exposed outside of the pallet main body 91. An inner space S of the cylinder 97 is defined between the second flange 95c of the replacement hook 95 and the proximal wall 97a of the cylinder 97.

The O-ring 99 is fitted into the groove 95d formed at the second flange 95c of the replacement hook 95. The O-ring 99 air-tightly contacts the inner surface of the side wall 97b of the cylinder 97.

The biasing section 101 biases the replacement hook 95 toward a retraction position (rightward). In this embodiment, the biasing section 101 is a coil spring and inserted between the distal wall 97c of the cylinder 97 and the second flange 95c of the replacement hook 95.

Figure 8:
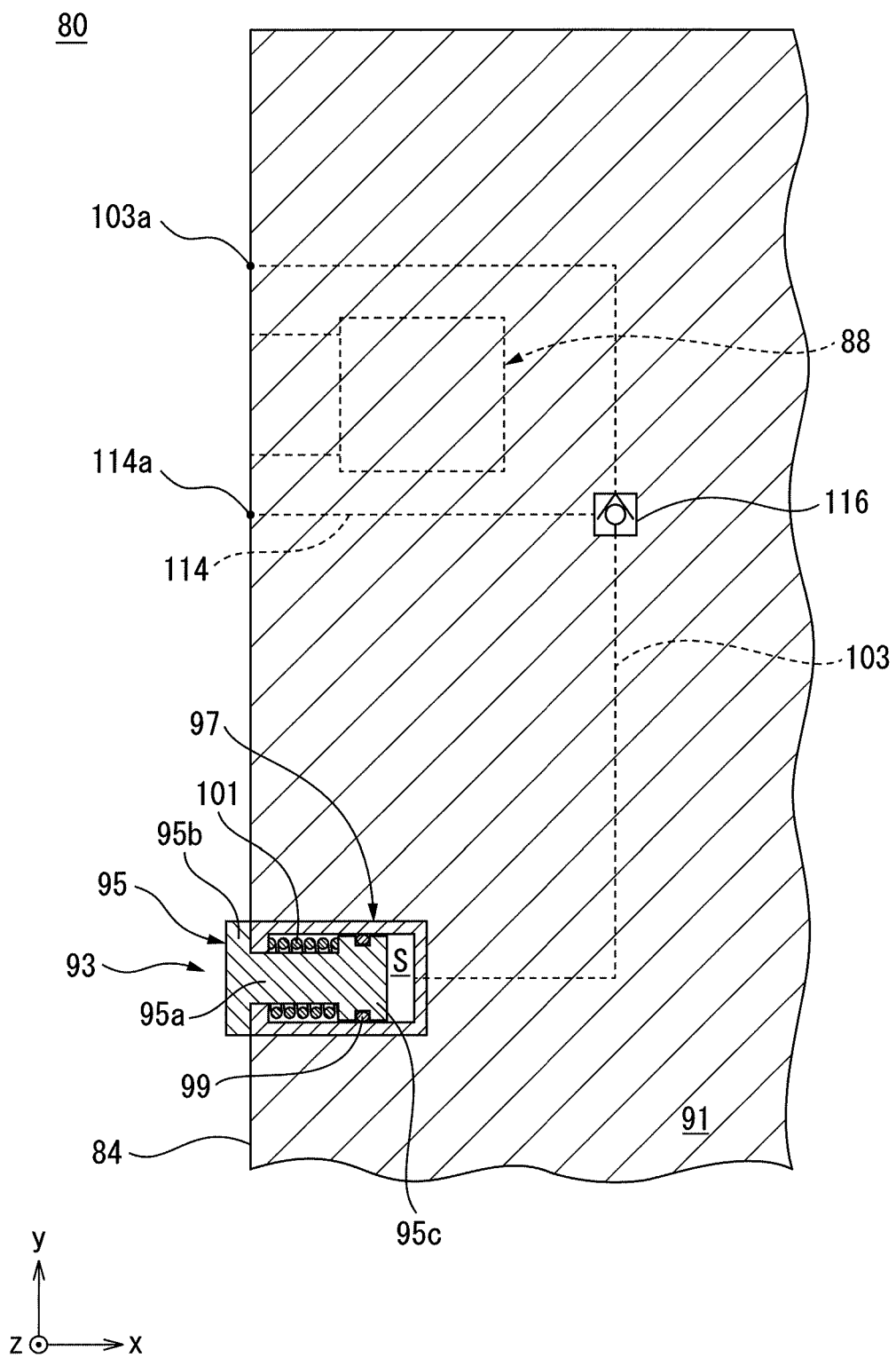
FIG. 8 is an enlarged view for explaining the configuration of the first pallet.

As illustrated in FIG. 8, the first pallet 80 further includes fluid paths 103 and 114, and a pilot check valve 116. The fluid path 103 extends inward of the pallet main body 91 from an open end 103a formed at the left end face 84 of the pallet main body 91, so as to be in fluid communication with the inner space S of the cylinder 97.

Note that, although FIG. 8 illustrates that the fluid path 103 is in fluid communication with the cylinder 97 of one hook device 93 for the sake of easy understanding, the fluid path 103 is also in fluid communication with the inner space S of the cylinder 97 of the other hook device 93.

The pilot check valve 116 is provided in the fluid path 103. The fluid path 114 extends inward of the pallet main body 91 from an open end 114a formed at the left end face 84 of the pallet main body 91, so as to be connected to the pilot check valve 116.

The pilot check valve 116 allows a fluid flow from the open end 103a to the cylinder 97. On the other hand, the pilot check valve 116 restricts a fluid flow from the cylinder 97 to the open end 103a in response to the pressure $P_{114}$ of the fluid in the fluid path 114.

More specifically, the pilot check valve 116 restricts the fluid flow from the cylinder 97 to the open end 103a when the pressure $P_{114}$ of the fluid in the fluid path 114 is set Low, while it allows the fluid flow from the cylinder 97 to the open end 103a when the pressure $P_{114}$ of the fluid in the fluid path 114 is set High.

The replacement hooks 95 of the two hook devices 93 are spaced away from each other in the y-axis direction so as to respectively correspond to the positions of the through holes formed at the distal ends of the two fingertips 32 of the robot hand 22.

More specifically, the distance between the replacement hooks 95 of the two hook devices 93 is equal to that between the through holes formed at the two fingertips 32 of the robot hand 22. The replacement hooks 95 are configured so as to be inserted into the respective through holes formed at the distal ends of the two fingertips 32 and engage these through holes.

In FIG. 7, the replacement hook 95 is arranged at the retraction position. In this state, the first flange 95b of the replacement hook 95 contacts the distal wall 97c of the cylinder 97, thereby the rightward movement of the replacement hook 95 is restricted.

In the state shown in FIG. 7, the shaft 95a and the second flange 95c of the replacement hook 95 are accommodated inward of the left end face 84 of the pallet main body 91, while the first flange 95b of the replacement hook 95 is exposed outside of the pallet main body 91.

When projecting out the replacement hook 95, a fluid is supplied to the inner space S of the cylinder 97 through the fluid path 103. Then, the pressure $P_{97}$ of the inner space S is set High, thereby the replacement hook 95 moves leftward to be arranged at a projection position illustrated in FIG. 9.

Figure 9:
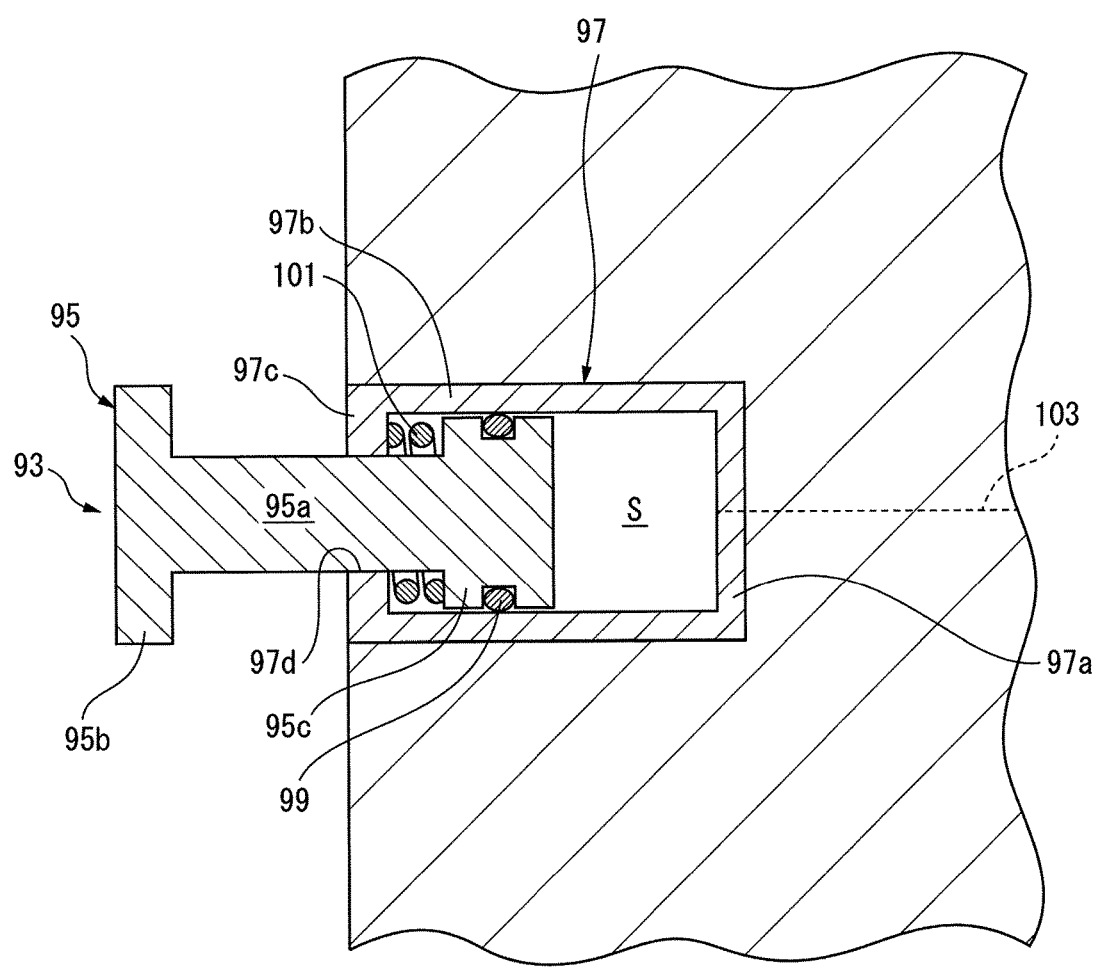
FIG. 9 is an enlarged cross-sectional view showing that the replacement hook illustrated in FIG. 7 is arranged at a projection position.

In the state shown in FIG. 9, the first flange 95b and most of the shaft 95a of the replacement hook 95 are exposed outside of the pallet main body 91.

Thus, in this embodiment, the replacement hook 95 is moved to the projection position by the pressure of the fluid supplied to the inner space S of the cylinder 97. Therefore, the cylinder 97 functions as a driving section configured to move the replacement hook 95 to the projection position.

When the replacement hook 95 is returned from the projection position to the retraction position, the supply of the fluid into the inner space S is stopped so as to set the pressure in the inner space S to be Low. As a result, the replacement hook 95 returns from the projection position illustrated in FIG. 9 to the retraction position illustrated in FIG. 7 by the action of the biasing section 101.

The second pallet 82 is attached to and detached from the second jig 72 of the movable section 52. As illustrated in FIG. 6, the second pallet 82 includes a pallet main body 105 and a total of two hook devices 107.

The pallet main body 105 is formed with a total of three holes 98 recessed leftward from a right end face 94 of the pallet main body 105. The holes 98 have circular outer shapes, and can slidably receive the respective shafts 76.

More specifically, each hole 98 includes a first hole part 98a and a second hole part 98b. The second hole part 98b has a diameter larger than that of the first hole part 98a, wherein a step 98c is formed at the connection between the first hole part 98a and the second hole part 98b.

A pin 100 is formed at the pallet main body 105 so as to project leftward from the left end face 102. The pin 100 can be received in the pin receiving hole 92 formed at the first pallet 80.

Figure 10:
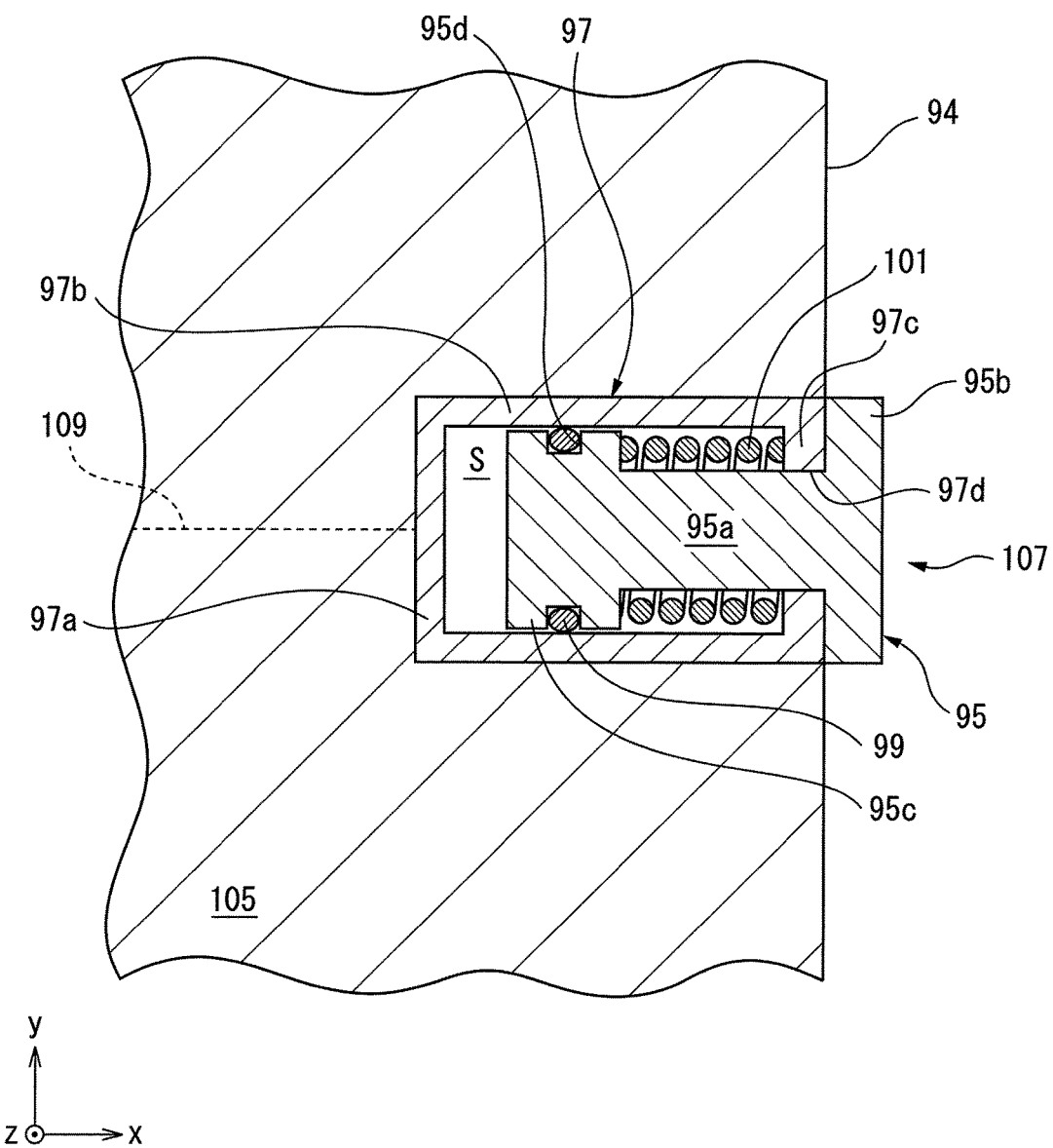
FIG. 10 is an enlarged cross-sectional view of a hook device provided in the second jig, wherein a replacement hook is arranged at a retraction position.

The hook devices 107 have the same configuration as that of the hook devices 93. More specifically, as illustrated in FIG. 10, each hook device 107 includes the replacement hook 95, the cylinder 97, the O-ring 99, and the biasing section 101. The cylinder 97 of each hook device 107 is embedded in the pallet main body 105, and the biasing section 101 of each hook device 107 biases the replacement hook 95 toward the retraction position (leftward).

Figure 11:
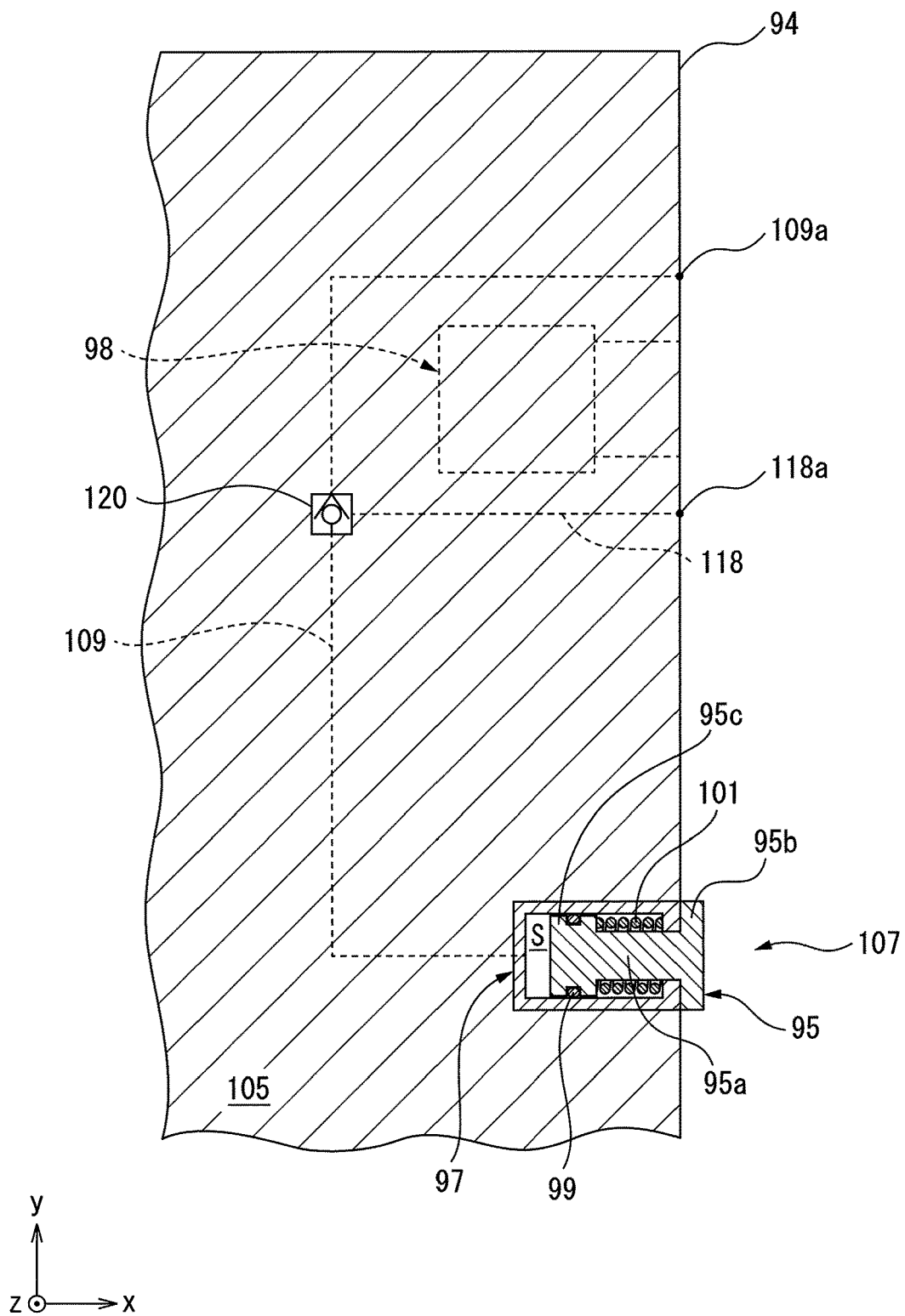
FIG. 11 is an enlarged view for explaining the configuration of the second pallet.

As illustrated in FIG. 11, the second pallet 82 further includes fluid paths 109 and 118, and a pilot check valve 120. The fluid path 109 extends inward of the pallet main body 105 from an open end 109a formed at the right end face 94 of the pallet main body 105, so as to be in fluid communication with an inner space S of the cylinder 97 of each hook device 107.

Note that, although FIG. 11 illustrates that the fluid path 109 is in fluid communication with the cylinder 97 of one hook device 107 for the sake of easy understanding, the fluid path 109 is also in fluid communication with the inner space S of the cylinder 97 of the other hook device 107.

The pilot check valve 120 is provided in the fluid path 109. The fluid path 118 extends inward of the pallet main body 105 from an open end 118a formed at the right end face 94 of the pallet main body 105, and is connected to the pilot check valve 120.

The pilot check valve 120 restricts the fluid flow from the cylinder 97 to the open end 109a in response to the pressure $P_{118}$ of the fluid in the fluid path 118, similarly as the above-mentioned pilot check valve 116.

More specifically, the fluid flow from the cylinder 97 to the open end 109a is restricted when the pressure $P_{118}$ of the fluid in the fluid path 118 is set Low, while the fluid flow from the cylinder 97 to the open end 109a is allowed when the pressure $P_{118}$ of the fluid in the fluid path 118 is set High.

The replacement hooks 95 of the two hook devices 107 are spaced away from each other in the y-axis direction so as to correspond to the positions of the through holes formed at the distal ends of the two fingertips 36 of the robot hand 22.

More specifically, the distance between the replacement hooks 95 of the two hook devices 107 is equal to that between the through holes formed at the two fingertips 36 of the robot hand 22. The replacement hooks 95 are configured so as to be inserted into the respective through holes formed at the distal ends of the two fingertips 36 and engage these through holes.

In FIG. 10, the replacement hook 95 of the hook device 107 is arranged at a retraction position. In this state, the first flange 95b of the replacement hook 95 contacts the distal wall 97c of the cylinder 97, thereby the leftward movement of the replacement hook 95 is restricted.

When projecting out the replacement hook 95 of each hook device 107, a fluid is supplied to the inner space S of the cylinder 97 through the fluid path 109. Then, the pressure $P_{97}$ of the inner space S is set High, thereby the replacement hook 95 moves rightward so as to be arranged at a projection position illustrated in FIG. 12.

When returning the replacement hook 95 of each hook device 107 from the projection position to the retraction position, the supply of the fluid to the inner space S is stopped so as to set the pressure of the inner space S to Low. Then, the replacement hook 95 returns from the projection position illustrated in FIG. 12 to the retraction position illustrated in FIG. 10 by the action of the biasing section 101.

The machine tool 14 further includes a first fluid supply section 110 and a second fluid supply section 112 (FIGS. 4 and 5). As illustrated in FIG. 4, the first fluid supply section 110 supplies a fluid from the open end 65a into the fluid path 65, in accordance with a command from the machine tool controller 42.

The fluid supplied into the fluid path 65 passes through the fluid path 65 and flows into the cylinder 63 of each pallet clamp 58 to actuate the cylinder 63 as described above. The second fluid supply section 112 supplies a fluid from the open end 69a into the fluid path 69, in accordance with a command from the machine tool controller 42.

As illustrated in FIG. 5, the first fluid supply section 110 further supplies a fluid from the open end 79a into the fluid path 79. The fluid supplied into the fluid path 79 passes through the fluid path 79 and flows into the cylinder 77 of each pallet clamp 74 to actuate the cylinder 77 as described above. The second fluid supply section 112 supplies a fluid from the open end 83a into the fluid path 83.

Next, the operation of the machining system 10 will be described. In order to machine various types of workpiece, the machining system 10 attaches the pallets 80 and 82, which correspond to the type of workpiece to be machined, to the jigs 46 and 72 by the robot 16.

Figure 13:
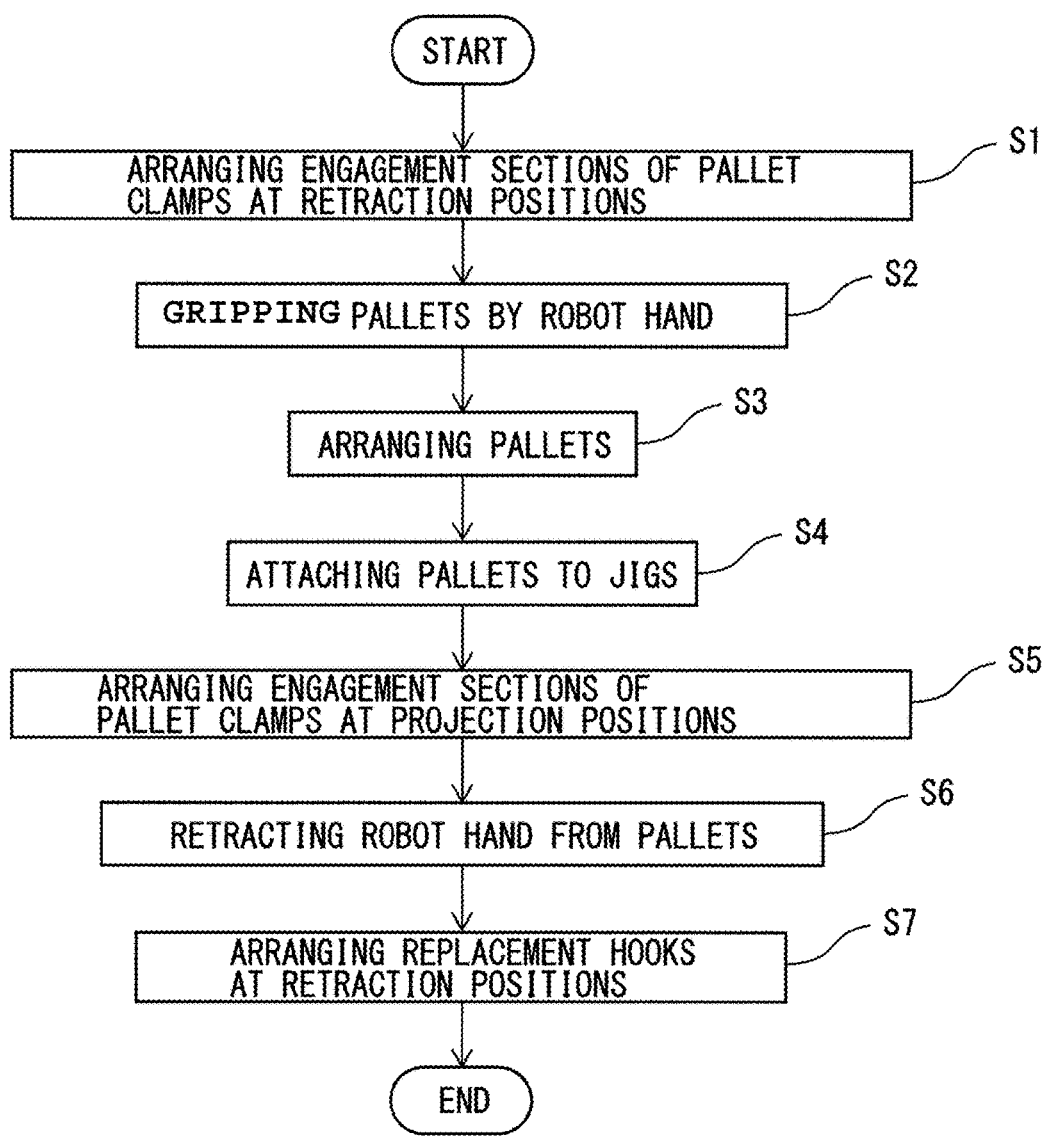
FIG. 13 is a flowchart of an exemplary operation of attaching pallets to jigs by the machining system illustrated in FIG. 1.

FIG. 13 is a flowchart showing an exemplary operation of attaching the pallets 80 and 82 to the jigs 46 and 72 by the machining system 10. The flow illustrated in FIG. 13 is started when the robot controller 18 or the machine tool controller 42 receives a pallet attachment command from a user, a host controller, or a machining program.

When the flow illustrated in FIG. 13 is started, the replacement hooks 95 of the hook devices 93 and 107 are arranged at the projection positions. That is, the pressures $P_{97}$ of the inner spaces S of the cylinders 97 of the hook devices 93 and 107 are set high.

At step S1, the machine tool controller 42 arranges the engagement sections 62 and 78 of the pallet clamps 58 and 74 at the retraction positions. More specifically, the machine tool controller 42 sends commands to the solenoid valves 51 and 53 so as to close the fluid paths 67 and 81, respectively.

Then, the machine tool controller 42 sends a command to the first fluid supply section 110 so as to supply a fluid into the fluid paths 65 and 79. Thereby, the cylinders 63 and 77 are actuated to place the engagement sections 62 and 78 at the retraction positions.

At step S2, the robot controller 18 grips the pallets 80 and 82 stored at a predetermined location by the robot hand 22.

In this embodiment, the first pallet 80 and the second pallet 82 are stored as a pair so that the right end face 90 of the first pallet 80 and the left end face 102 of the second pallet 82 are in surface-contact with each other, as illustrated in FIG. 1. In this state, the pin 100 provided at the second pallet 82 is received in the pin receiving hole 92 formed in the first pallet 80.

At this step S2, the robot controller 18 sends a command to each servomotor built in the manipulator 20 in accordance with a robot program so as to move the robot hand 22 to the position of the first pallet 80 and the second pallet 82 stored at the predetermined location.

At this time, the through holes formed at the distal ends of the fingertips 32 of the robot hand 22 are arranged adjacent to left side of the respective replacement hooks 95 of the hook devices 93. On the other hand, the through holes formed at the distal ends of the fingertips 36 of the robot hand 22 are arranged adjacent to right side of the respective replacement hooks 95 of the hook devices 107.

The robot program for moving the robot hand 22 by the manipulator 20 can be constructed by teaching the robot 16 the movement path of the manipulator 20 when carrying out this operation.

Then, the robot controller 18 sends a command to the finger driving section provided in the robot hand 22 so as to close the fingers 26 and 28 of the robot hand 22. As a result, the replacement hooks 95 of the hook devices 93 are inserted into the respective through holes formed at the distal ends of the fingertips 32, and engage these through holes.

Further, the replacement hooks 95 of the hook devices 107 are inserted into the respective through holes formed at the distal ends of the fingertips 36, and engage these through holes. In this way, the pair of the first pallet 80 and second pallet 82 stored at the predetermined location is gripped by the robot hand 22.

Thus, in this embodiment, the robot hand 22 functions as a holding section configured to hold the replacement hooks 95.

At step S3, the robot controller 18 arranges the pair of the first pallet 80 and second pallet 82 gripped by the robot hand 22 at a position between the first jig 46 and the second jig 72.

More specifically, the robot controller 18 operates the manipulator 20 in accordance with the robot program so as to move the robot hand 22 gripping the first pallet 80 and the second pallet 82. The robot controller 18 then arranges the first pallet 80 and the second pallet 82 at the position illustrated in FIGS. 1 and 2.

As described above, in this embodiment, the pin 100 formed at the second pallet 82 is received in the pin receiving hole 92 formed in the first pallet 80. By the engagement between the pin 100 and the pin receiving hole 92, it is possible to prevent the first pallet 80 and the second pallet 82 from opening when the first pallet 80 and the second pallet 82 are gripped and lifted by the robot hand 22 at this step S3.

In the state shown in FIGS. 1 and 2, the holes 88 formed in the first pallet 80 are respectively positioned adjacent to right side of the shafts 60 provided at the first jig 46. On the other hand, the holes 98 formed in the second pallet 82 are respectively positioned adjacent to left side of the shafts 76 provided at the second jig 72.

At step S4, the robot controller 18 and the machine tool controller 42 attach the pallets 80 and 82 to the jigs 46 and 72. More specifically, the robot controller 18 moves the first pallet 80 and the second pallet 82 gripped by the robot hand 22 toward the first jig 46.

More specifically, the robot controller 18 operates the manipulator 20 in accordance with the robot program so as to move the robot hand 22 gripping the first pallet 80 and the second pallet 82 leftward from the position illustrated in FIGS. 1 and 2.

As a result, the shafts 60 of the pallet clamps 58 are inserted into the respective holes 88 formed in the first pallet 80, thereby the right end face 59a of the boss 59 and the left end face 84 of the pallet main body 91 contact each other.

Figure 14:
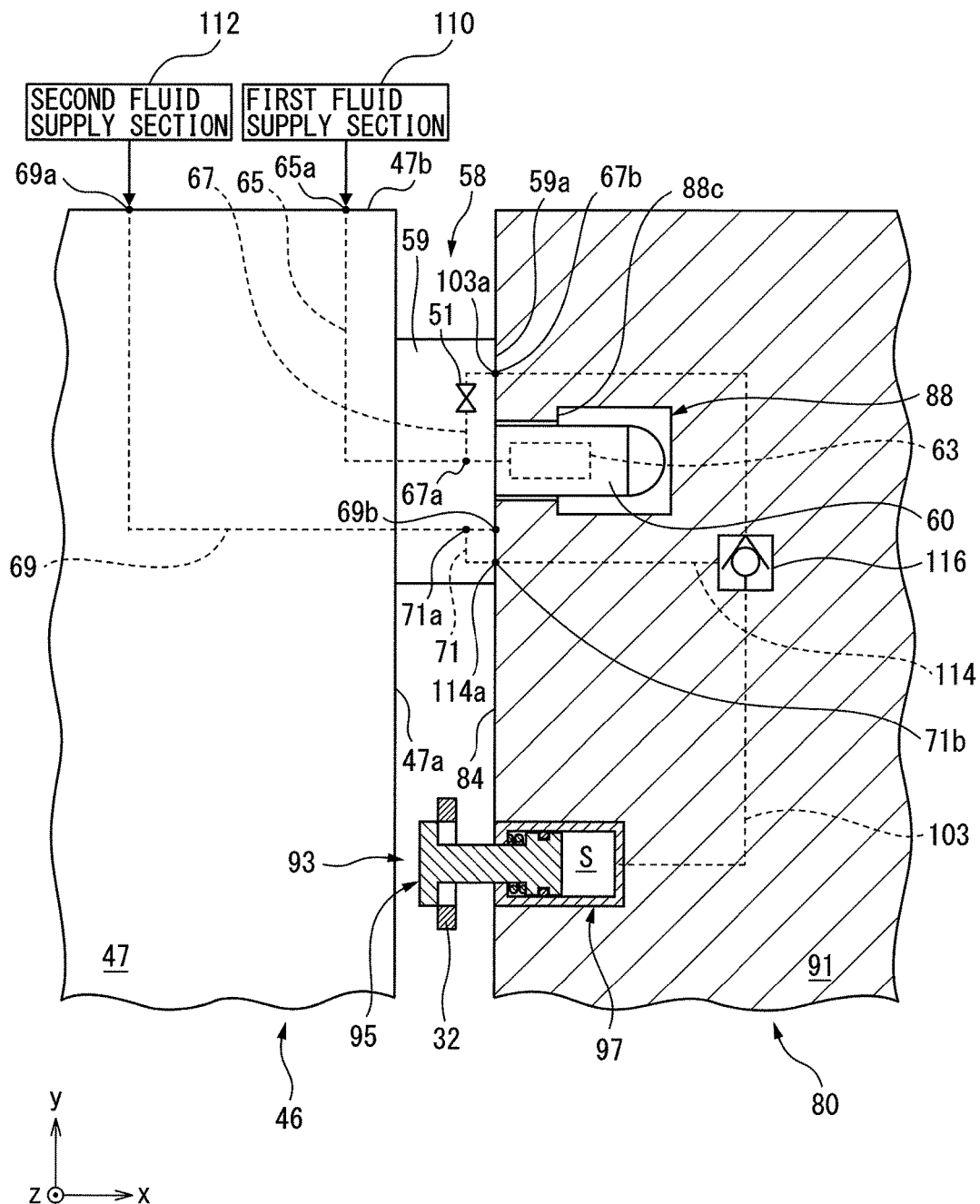
FIG. 14 illustrates the first pallet and the first jig at the end of step S4 in FIG. 1.

This state is shown in FIG. 14. In the state shown in FIG. 14, the position of the open end 67b of the fluid path 67 in the y-z plane coincides with that of the open end 103a of the fluid path 103 in the y-z plane, thereby, the fluid paths 67 and 103 are in fluid communication with each other. Further, the position of the open end 71b of the fluid path 71 in the y-z plane coincides with that of the open end 114a of the fluid path 114 in the y-z plane, thereby, the fluid paths 71 and 114 are in fluid communication with each other.

Then, the machine tool controller 42 operates the jig driving section 50 so as to move the movable section 52 toward the first jig 46. More specifically, the machine tool controller 42 operates the jig driving section 50 so as to advance the cylinder shaft 68 leftward to move the movable section 52 leftward.

Due to this, the shafts 76 provided at the second jig 72 are respectively inserted into the holes 98 formed at the second pallet 82, thereby the left end face 75a of the boss 75 and the right end face 94 of the pallet main body 105 contact each other.

Figure 15:
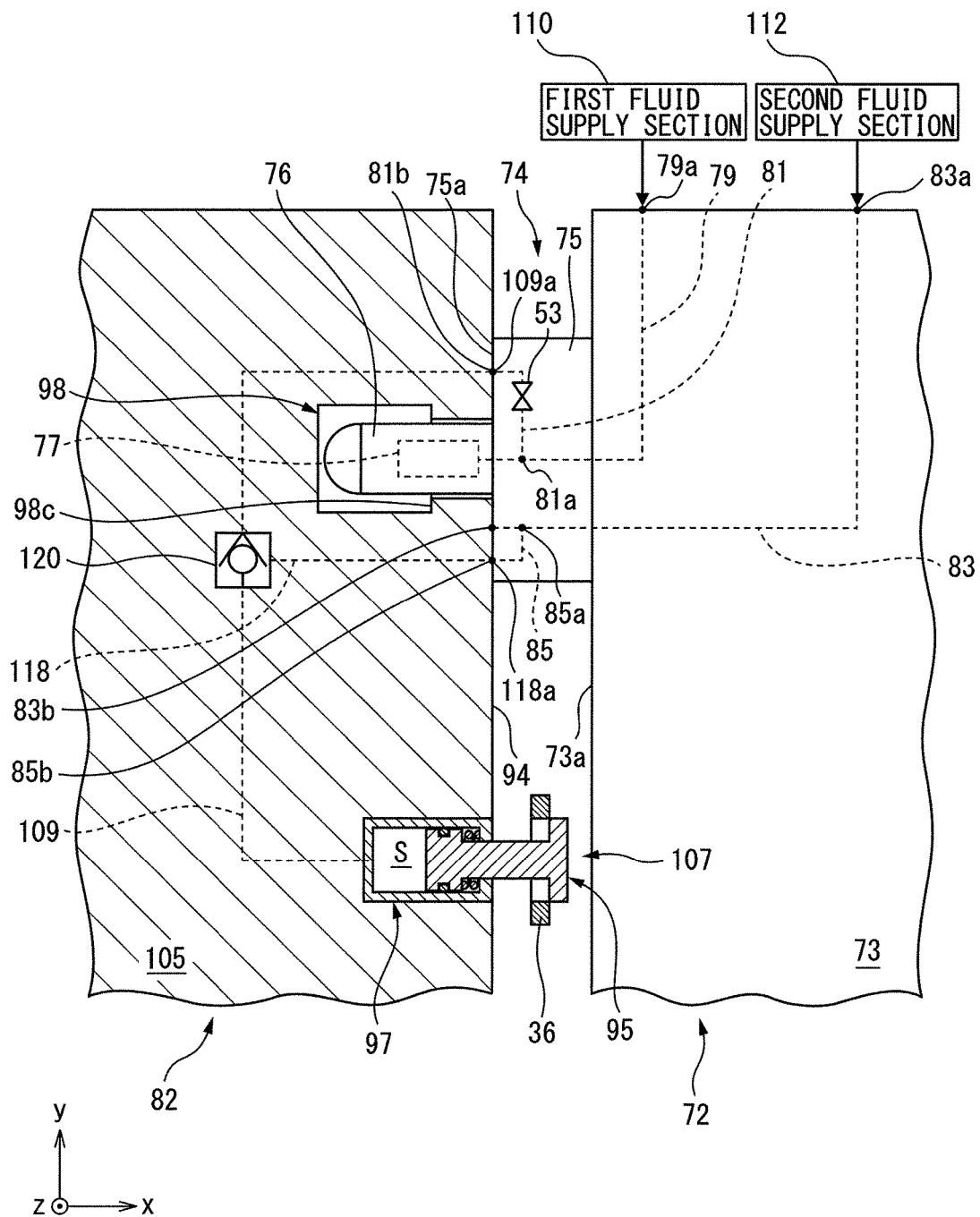
FIG. 15 illustrates the second pallet and the second jig at the end of step S4 in FIG. 1.

This stated is shown in FIG. 15. In the state shown in FIG. 15, the position of the open end 81b of the fluid path 81 in the y-z plane coincides with that of the open end 109a of the fluid path 109 in the y-z plane, thereby, the fluid paths 81 and 109 are in fluid communication with each other. Further, the position of the open end 85b of the fluid path 85 in the y-z plane coincides with that of the open end 118a of the fluid path 118 in the y-z plane, thereby, the fluid paths 85 and 118 are in fluid communication with each other.

In this manner, at this step S4, the first pallet 80 and the second pallet 82 are clamped between the first jig and the second jig so as to be attached to the first jig and the second jig, respectively.

At step S5, the machine tool controller 42 arranges the engagement sections 62 and 78 of the pallet clamps 58 and 74 at the projection positions. More specifically, the machine tool controller 42 sends a command to the first fluid supply section 110 so as to stop the supply of the fluid into the fluid paths 65 and 79 and reduce the pressure $P_{63}$ in the cylinder 63 and the pressure $P_{77}$ in the cylinder 77 to Low.

Due to this, the engagement sections 62 and 78 are arranged at the projection positions, thereby the engagement section 62 engages the step 88c and the engagement section 78 engages the step 98c. Thus, the first pallet 80 is clamped by the first jig 46 and the second pallet 82 is clamped by the second jig 72.

At step S6, the robot controller 18 releases the first pallet 80 and the second pallet 82 from the robot hand 22, and retracts the robot hand 22 from the first pallet 80 and the second pallet 82.

More specifically, the robot controller 18 sends a command to the finger driving section provided in the robot hand 22 so as to open the fingers 26 and 28 of the robot hand 22. Thus, the replacement hooks 95 of the hook devices 93 are pulled out from the through holes formed at the distal ends of the fingertips 32 of the robot hand 22.

Further, the replacement hooks 95 of the hook devices 107 are pulled out from the through holes formed at the distal ends of the fingertips 36 of the robot hand 22. Thus, the robot hand 22 releases the first pallet 80 and the second pallet 82.

Then, the robot controller 18 sends a command to each servomotor built in the manipulator 20 so as to move the robot hand 22 away from the first pallet 80 and the second pallet 82.

At step S7, the machine tool controller 42 arranges the replacement hooks 95 of the hook devices 93 and 107 at the retraction positions. More specifically, the machine tool controller 42 opens the solenoid valves 51 and 53.

Then, the machine tool controller 42 sends a command to the second fluid supply section 112 so as to supply a fluid from the open end 69a of the first jig 46 into the fluid path 69. The fluid supplied into the fluid path 69 is about to flow out of the open end 69b.

If the right end face 59a of the first jig 46 does not tightly contact the left end face 84 of the first pallet 80, the fluid leaks out from the open end 69b. The machine tool controller 42 monitors the pressure of the fluid in the fluid path 69, and determines that the right end face 59a does not tightly contact the left end face 84 when this pressure is lower than a predetermined threshold, and outputs a warning to the user.

The fluid supplied into the fluid path 69 partially flows from the bifurcation 71a into the fluid path 71, passes through the fluid path 71, and flows from the open end 114a into the fluid path 114. Due to this, the pressure $P_{114}$ in the fluid path 114 is set High, thereby the pilot check valve 116 allows the fluid flow from the cylinder 97 of each hook device 93 to the open end 103a.

In this regard, at the above-mentioned step S5, the fluid supply from the first fluid supply section 110 to the cylinder 63 of each pallet clamp 58 is stopped, thereby the pressure $P_{63}$ in the cylinder 63 and the pressure in the fluid path 65 are set Low.

Accordingly, when the pilot check valve 116 allows the fluid flow from the cylinder 97 of each hook device 93 to the open end 103a, the inner space S of the cylinder 97 and the fluid path 65 are in fluid communication with each other through the fluid paths 103 and 67 and the solenoid valve 51, thereby the pressure $P_{97}$ in the cylinder 97 is also set Low.

As a result, the replacement hook 95 is moved to the retraction position by the action of the biasing section 101 of each hook device 93 so as to be arranged at the retraction position illustrated in FIG. 7.

Similarly, the second fluid supply section 112 supplies a fluid from the open end 83a of the second jig 72 into the fluid path 83. The machine tool controller 42 monitors the pressure of the fluid in the fluid path 83, and determines whether the left end face 75a of the second jig 72 and the right end face 94 of the second pallet 82 tightly contact each other.

The fluid supplied into the fluid path 83 partially flows from the bifurcation 85a into the fluid path 85, passes through the fluid path 85, and flows from the open end 118a into the fluid path 118. Thus, the pressure $P_{118}$ in the fluid path 118 is set High, thereby the pilot check valve 120 allows the fluid flow from the cylinder 97 of each hook device 107 to the open end 109a.

At this time, the pressure $P_{77}$ in the cylinder 77 and the pressure in the fluid path 79 are set Low (step S5). Accordingly, when the pilot check valve 120 allows the fluid flow from the cylinder 97 of each hook device 107 to the open end 109a, the inner space S of this cylinder 97 and the fluid path 65 are in fluid communication with each other through the fluid paths 109 and 81 and the solenoid valve 53, thereby the pressure $P_{97}$ in this cylinder 97 is also set Low.

As a result, the replacement hook 95 is moved to the retraction position by the action of the biasing section 101 of each hook device 107 so as to be arranged at the retraction position illustrated in FIG. 10. Then, the robot controller 18 and the machine tool controller 42 end the flow illustrated in FIG. 13.

After the end of the flow illustrated in FIG. 13, the machine tool controller 42 operates the spindle 39 to machine the workpiece clamped by the first pallet 80 and the second pallet 82.

Next, an operation of detaching the pallets 80 and 82, which have been attached to the jigs 46 and 72 by the flow illustrated in FIG. 13, from the jigs 46 and 72 by the machining system 10 will be described.

Figure 16:
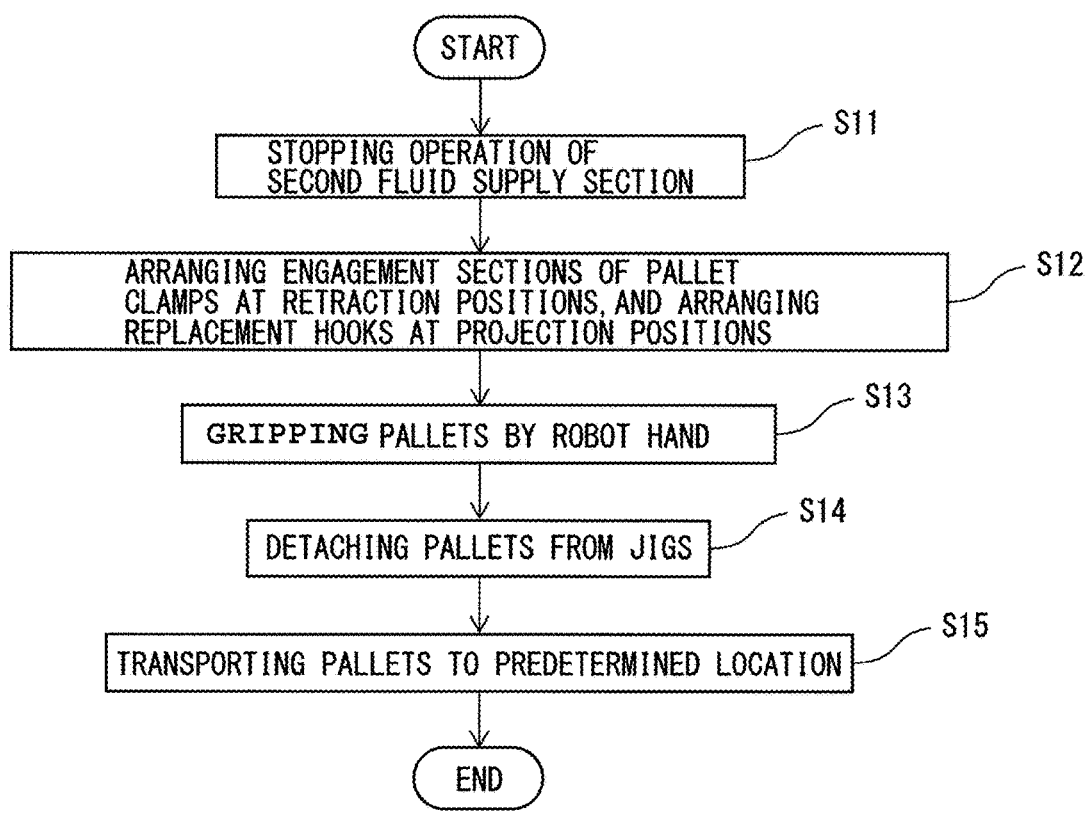
FIG. 16 is a flowchart illustrating an exemplary operation of detaching the pallets from the jigs by the machining system illustrated in FIG. 1.

FIG. 16 is a flowchart illustrating an exemplary operation of detaching the pallets 80 and 82. The flow illustrated in FIG. 16 is started when the robot controller 18 or the machine tool controller 42 receives a pallet detachment command from a user, a host controller, or a machining program.

At step S11, the machine tool controller 42 stops the operation of the second fluid supply section 112. The second fluid supply section 112 has been activated at the above-mentioned step S7, and continuously supplies the fluid into the fluid paths 69 and 83 during the workpiece-machining in order to monitor the mount state of the pallets on the jigs.

At this step S11, the machine tool controller 42 sends a command to the second fluid supply section 112 so as to stop the fluid supply into the fluid paths 69 and 83. Due to this, the pressure in the fluid path 69 is set Low, and the pressure $P_{114}$ in the fluid path 114, which is in fluid communication with the fluid path 69, is also set Low. As a result, the pilot check valve 116 restricts the fluid flow from the cylinder 97 of each hook device 93 to the open end 103a.

Similarly, the pressure in the fluid path 83 is set Low, and the pressure $P_{118}$ in the fluid path 118, which is in fluid communication with the fluid path 83, is also set Low. As a result, the pilot check valve 120 restricts the fluid flow from the cylinder 97 of each hook device 107 to the open end 109a.

At step S12, the machine tool controller 42 arranges the engagement sections 62 and 78 of the pallet clamps 58 and 74 at the retraction positions, and arranges the replacement hooks 95 of the hook devices 93 and 107 at the projection positions.

More specifically, the machine tool controller 42 sends a command to the first fluid supply section 110 so as to supply a fluid into the fluid paths 65 and 79. Due to this, the cylinders 63 and 77 are actuated to arrange the engagement sections 62 and 78 at the retraction positions.

At this time, the fluid flowing into the fluid path 65 partially flows from the bifurcation 67a into the fluid path 67. The fluid then passes through the solenoid valve 51, which has been opened at step S7, flows from the open end 103a into the fluid path 103, passes through the fluid path 103 and the pilot check valve 116, and flows into the inner space S of the cylinder 97 of each hook device 93.

As a result, the pressure $P_{97}$ of the inner space S of the cylinder 97 is set High, thereby the replacement hook 95 of each hook device 93 moves leftward so as to be arranged at the projection position illustrated in FIG. 9.

Similarly, the fluid flowing into the fluid path 79 partially flows from the bifurcation 81a into the fluid path 81. The fluid then passes through the solenoid valve 53, which has been opened at step S7, flows from an open end 109b into the fluid path 109, passes through the fluid path 109 and the pilot check valve 120, and flows into the inner space S of the cylinder 97 of each hook device 107.

Figure 12:
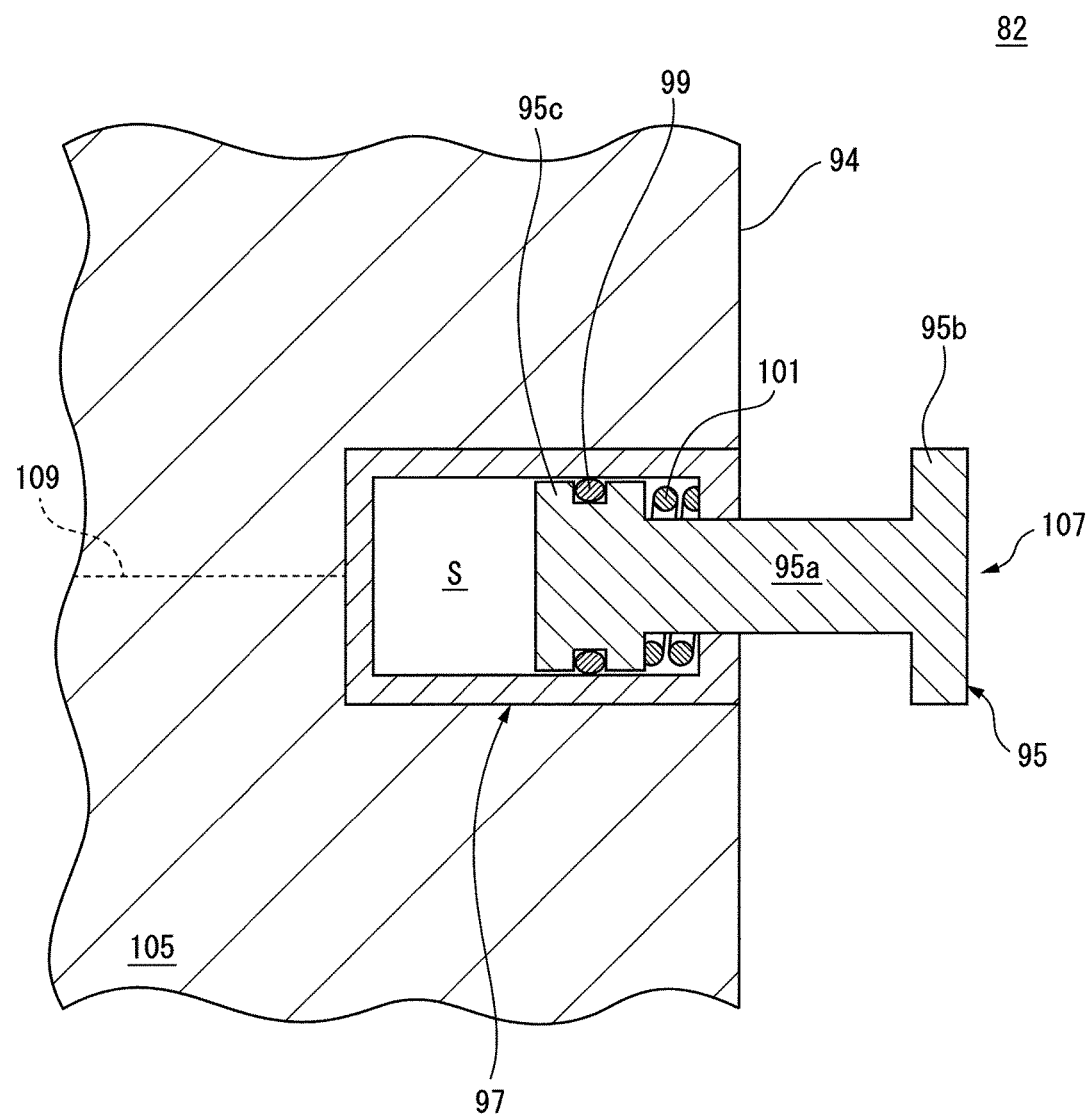
FIG. 12 is an enlarged cross-sectional view showing that the replacement hook illustrated in FIG. 10 is arranged at a projection position.

As a result, the pressure $P_{97}$ of the inner space S of the cylinder 97 is set High, thereby the replacement hook 95 of each hook device 107 moves rightward so as to be arranged at the projection position illustrated in FIG. 12.

In addition, the pilot check valve 116 restricts the fluid flow from the cylinder 97 of each hook device 93 to the open end 103a, and the pilot check valve 120 restricts the fluid flow from the cylinder 97 of each hook device 107 to the open end 109a.

Therefore, the pressures $P_{97}$ of the inner spaces S of the cylinders 97 of the hook devices 93 and 107 are kept high, by which, the replacement hooks 95 are held at their projection positions.

Thus, in this embodiment, each of the pilot check valves 116 and 120 functions as a position maintaining section configured to maintain the position of the replacement hook 95 when the replacement hook 95 is arranged at the projection position.

At step S13, the machine tool controller 42 grips the pallets 80 and 82 attached to the jigs 46 and 72 by the robot hand 22. More specifically, the robot controller 18 operates the manipulator 20 in accordance with the robot program so as to move the robot hand 22 to the position of the first pallet 80 and the second pallet 82 respectively attached to the first jig 46 and the second jig 72.

At this time, the through holes formed at the distal ends of the fingertips 32 of the robot hand 22 are arranged adjacent to left side of the respective replacement hooks 95 of the hook devices 93. On the other hand, the through holes formed at the distal ends of the fingertips 36 of the robot hand 22 are arranged adjacent to right side of the respective replacement hooks 95 of the hook devices 107.

Then, the robot controller 18 sends a command to the finger driving section provided in the robot hand 22 so as to close the fingers 26 and 28 of the robot hand 22. As a result, the replacement hooks 95 of the hook devices 93 are inserted into the respective through holes formed at the distal ends of the fingertips 32, and engage these through holes.

Further, the replacement hooks 95 of the hook devices 107 are inserted into the respective through holes formed at the distal ends of the fingertips 36, and engage these through holes. Thus, the first pallet 80 and the second pallet 82 are gripped by the robot hand 22.

At step S14, the robot controller 18 detaches the pallets 80 and 82 from the jigs 46 and 72. More specifically, the machine tool controller 42 operates the jig driving section 50 so as to move the movable section 52 in the direction away from the first jig 46. At this time, the first pallet 80 and the second pallet 82 are gripped by the robot hand 22.

Accordingly, the movable section 52 separates from the second pallet 82, along with which, the shafts 76 provided at the second jig 72 are pulled out from the holes 98 formed in the second pallet 82.

Then, robot controller 18 operates the manipulator 20 so as to move the first pallet 80 and the second pallet 82 gripped by the robot hand 22 rightward. Thereby, the second pallet 82 separates from the first jig 46, along with which, the shafts 60 provided at the first jig 46 are pulled out from the holes 88 formed in the first pallet 80.

At step S15, the robot controller 18 operates the manipulator 20 so as to transport the first pallet 80 and the second pallet 82 gripped by the robot hand 22 to a predetermined location, and put them on this location.

As described above, in this embodiment, the replacement hooks 95 can move between the projection positions and the retraction positions. According to this configuration, when the pallets 80 and 82 are transferred by the robot 16, the replacement hooks 95 can be arranged at the projection positions so as to be held by the robot hand 22 (steps S2 and S13).

On the other hand, upon machining a workpiece, the replacement hooks 95 can be arranged at the retraction positions, thereby it is possible to prevent the workpiece or the tool 39a mounted on the spindle 39 from interfering with the replacement hooks 95 during workpiece machining.

Further, since the tool 39a, etc. do not interfere with the replacement hooks 95 during workpiece machining, the positions of the replacement hooks 95 can be set common between various types of pallets 80 and 82. Therefore, since it is not necessary to change the robot hand 22 in response to the type of pallets 80, 82, the work efficiency can be improved.

Further, in this embodiment, due to the fluid paths 67 and 103 (or the fluid paths 79 and 109), the cylinder 63 (or the cylinder 77) and the cylinder 97 can be actuated by the fluid supplied from the first fluid supply section 110.

According to this configuration, since the cylinder 63 (or the cylinder 77) and the cylinder 97 can be actuated by a common actuation section (i.e., the first fluid supply section 110), the number of components can be reduced. Further, since the operation of clamping the pallet 80 (or the pallet 82) by the jig 46 (or the jig 72) and the operation of arranging the replacement hooks 95 at the projection positions can be interlocked with each other, it is possible to shorten the cycle time.

In this embodiment, by the fluid paths 71 and 114 (or the fluid paths 85 and 118), the fluid, which is supplied from the second fluid supply section 112 in order to determine whether the jig 46 (or the jig 72) tightly contacts the pallet 80 (or the pallet 82), is utilized to control the pilot check valve 116 (or the pilot check valve 120).

According to this configuration, since it is not necessary to provide another fluid supply section for controlling the pilot check valve 116, the number of components can be reduced.

Next, a first pallet 80' according to another embodiment will be described with reference to FIGS. 17 and 18. The first pallet 80' can be applied to the pallet device 40 in place of the first pallet 80.

The first pallet 80' is different from the above-mentioned first pallet 80 in the following configuration, wherein the first pallet 80' includes a hook device 93', a position maintaining cylinder mechanism 130, fluid paths 114' and 132, a solenoid valve 134, and a fluid delay circuit 136.

The hook device 93' is different from the above-mentioned hook device 93 in the configurations of a replacement hook 95' and a cylinder 97'. Specifically, the replacement hook 95' further includes a rod 138 projecting rightward from a second flange 95c. An inclined surface 138a inclined with respect to the x-axis is formed at the right end of the rod 138.

A central hole 139 is formed at a proximal wall 97a' of the cylinder 97'. The rod 138 is inserted into the central hole 139 so as to be slidable in the x-axis direction.

The position maintaining cylinder mechanism 130 includes a cylinder 142, a cylinder shaft 144 movably received in the cylinder 142, and a biasing section 146 (second biasing section). The cylinder shaft 144 includes a shaft part 144a extending in the y-axis direction, and a flange 144b projecting out from the front end of the shaft part 144a.

The shaft part 144a passes through a hole formed at a distal wall 142a of the cylinder 142 so as to extend rearward from the cylinder 142. An inclined surface 144c which is inclined with respect to the x-axis by an angle substantially the same as the inclined surface 138a is formed at the rear end of the shaft part 144a.

The biasing section 146 is placed in the cylinder 142 and biases the cylinder shaft 144 frontward. The biasing section 146 is inserted between the flange 144b and the distal wall 142a of the cylinder 142.

The fluid path 114' extends from an open end 114a so as to be in fluid communication with an inner space $S_2$ of the cylinder 142 defined between the distal wall 142a of the cylinder 142 and the flange 144b. The fluid path 132 is diverged from the fluid path 103 at a bifurcation 132a so as to be in fluid communication with an inner space $S_3$ of the cylinder 142 defined between a proximal wall 142b of the cylinder 142 and the flange 144b.

The solenoid valve 134 and the fluid delay circuit 136 are provided in the fluid path 132. The solenoid valve 134 opens and closes the fluid path 132 in accordance with a command from the machine tool controller 42. The fluid delay circuit 136 allows a fluid flowing into the fluid delay circuit 136 to pass there toward the downstream side thereof after a predetermined time elapses from the time point when the fluid flows into the fluid delay circuit 136.

The machining system 10 including the first pallet 80' according to this embodiment carried out the flows illustrated in FIGS. 13 and 16, as in the above-described embodiment.

For example, at step S12, the machine tool controller 42 firstly opens the solenoid valve 134. Then, the machine tool controller 42 sends a command to the first fluid supply section 110 so as to supply the fluid into the fluid path 65. Due to this, the cylinder 63 is actuated to arrange the engagement sections 62 and 78 at the retraction positions.

At this time, the fluid flowing into the fluid path 65 partially flows from the bifurcation 67a into the fluid path 67, passes through the fluid path 103, and flows into the inner space S of the cylinder 97' of the hook device 93'. As a result, the pressure $P_{97}$ of the inner space S of the cylinder 97' is set High, thereby the replacement hook 95' of the hook device 93' moves leftward so as to be arranged at the projection position.

Further, the fluid flowing into the fluid path 103 partially flows from the bifurcation 132a into the fluid path 132, passes through the solenoid valve 134, and flows into the fluid delay circuit 136. The fluid passing through the fluid delay circuit 136 flows into the inner space $S_3$ of the cylinder 142. Thus, the pressure $P_{142}$ of the inner space $S_3$ is set High, thereby the cylinder shaft 144 is moved rearward.

As described above, the fluid delay circuit 136 passes the fluid flowing thereinto after the predetermined time elapses. In other words, the fluid delay circuit 136 delays the fluid reaching the inner space $S_3$ of the cylinder 142.

Due to this configuration, the pressure $P_{142}$ of the inner space $S_3$ of the cylinder 142 is set High after the replacement hook 95' of the hook device 93' is arranged at the projection position. Therefore, the cylinder shaft 144 is moved rearward after the replacement hook 95' is arranged at the projection position.

Figure 18:
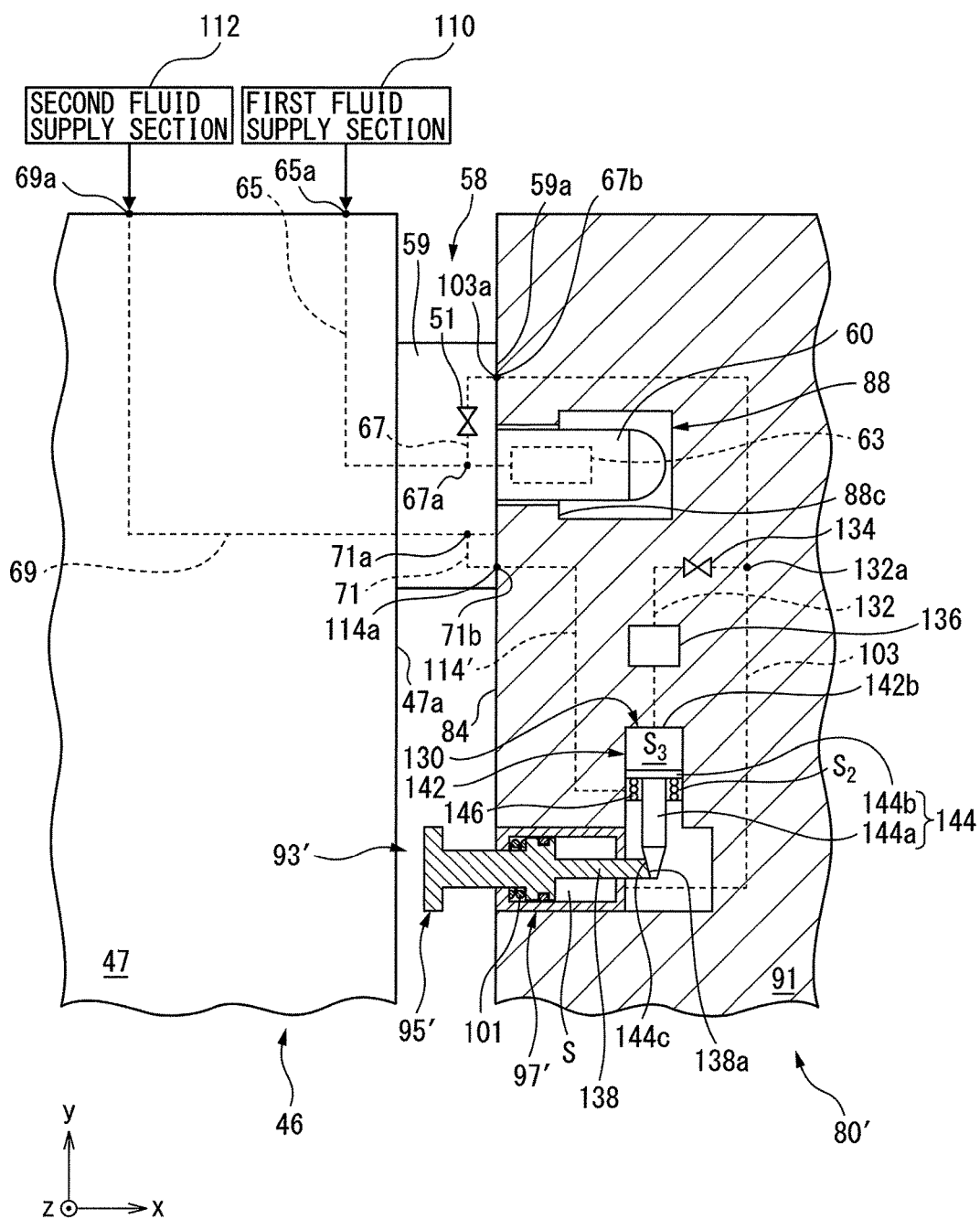
FIG. 18 illustrates that the replacement hook of the pallet illustrated in FIG. 17 is arranged at the projection position.

As a result, as illustrated in FIG. 18, the inclined surface 144c formed at the shaft part 144a of the cylinder shaft 144 surface-contacts and engages the inclined surface 138a formed at the rod 138 of the replacement hook 95' arranged at the projection position. Thus, the movement of the replacement hook 95' toward the retraction position (i.e., rightward) is restricted.

Then, the machine tool controller 42 closes the solenoid valve 134. Due to this, the pressure $P_{142-3}$ of the inner space $S_3$ of the cylinder 142 is kept high, thereby the replacement hook 95' is held at the projection position.

Figure 17:
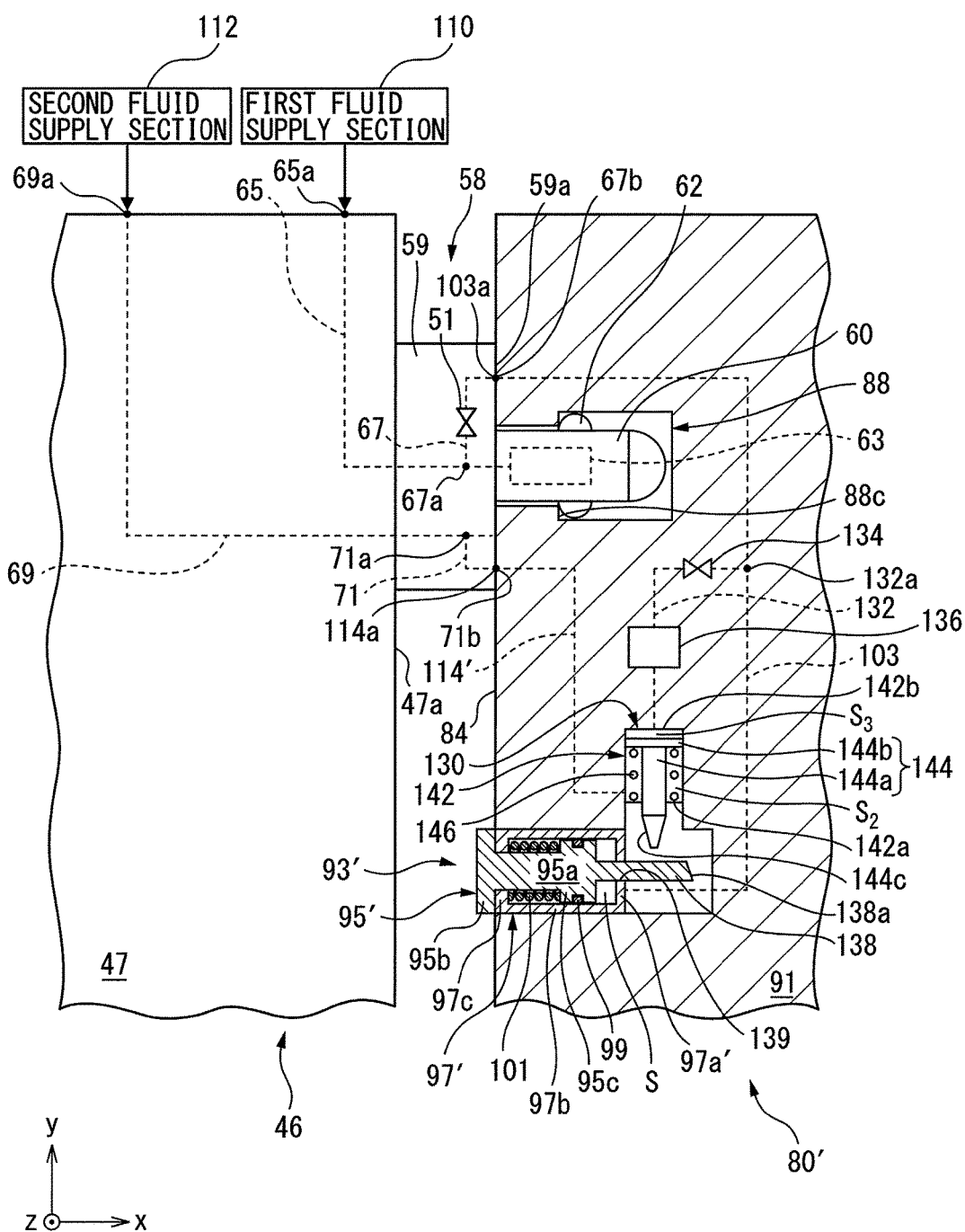
FIG. 17 is a view of a pallet according to another embodiment, wherein the replacement hook is arranged at the retraction position.

When the replacement hook 95' is returned from the projection position illustrated in FIG. 18 to the retraction position illustrated in FIG. 17 at step S7, the machine tool controller 42 opens the solenoid valves 51 and 134.

By this, the fluid flow from the inner space S of the cylinder 97' into the fluid path 65 and the fluid flow from the inner space $S_3$ of the cylinder 142 into the fluid path 65 are allowed, as a result of which, the pressure $P_{97}$ of the inner space S of the cylinder 97' and the pressure $P_{142-3}$ of the inner space $S_3$ of the cylinder 142 are set Low.

Then, the machine tool controller 42 sends a command to the second fluid supply section 112 so as to supply the fluid into the fluid path 69. The fluid supplied into the fluid path 69 partially flows from the bifurcation 71a into the fluid path 71, and flows from the open end 114a into the fluid path 114'.

The fluid flowing into the fluid path 114' passes through the fluid path 114' and flows into the inner space $S_2$ of the cylinder 142. Thus, the pressure $P_{142-2}$ of the inner space $S_2$ of the cylinder 142 is set High. The cylinder shaft 144 is moved frontward by the pressure $P_{142-2}$ of the inner space $S_2$ and the action of the biasing section 146.

As a result, the shaft part 144a of the cylinder shaft 144 disengages from the rod 138 of the replacement hook 95', thereby the movement of the replacement hook 95' toward the retraction position is allowed. Thus, the replacement hook 95' moves toward the retraction position by the action of the biasing section 101, and returns to the retraction position illustrated in FIG. 17.

In this manner, the cylinder shaft 144 moves between the engagement position where the cylinder shaft 144 engages the replacement hook 95' and the disengagement position where the cylinder shaft 144 disengages from the replacement hook 95'. The cylinder shaft 144 restricts the movement of the replacement hook 95' toward the retraction position when arranged at the engagement position, while the cylinder shaft 144 allows the movement of the replacement hook 95' toward the retraction position when arranged at the disengagement position.

Thus, the cylinder shaft 144 functions as a movement restriction section configured to selectively restrict the movement of the replacement hook 95'. Further, the cylinder 142 serves as a second driving section configured to move the cylinder shaft 144 to the engagement position.

Further, the replacement hook 95' is maintained at the projection position by the action of the position maintaining cylinder mechanism 130. Therefore, the position maintaining cylinder mechanism 130 functions as a position maintaining section configured to maintain the position of the replacement hook 95' when the replacement hook 95' is arranged at the projection position.

As described above, in this embodiment, the replacement hook 95' can be stably arranged at the projection position by the position maintaining cylinder mechanism 130. Further, the inclined surface 138a formed on the replacement hook 95' and the inclined surface 144c formed on the cylinder shaft 144 surface-contact and engage each other. At this time, since the replacement hook 95' is biased rightward by the biasing section 101, the replacement hook 95' receives a rearward force from the inclined surface 144c.

Due to this, the replacement hook 95' is pressed against the cylinder 97' and firmly supported by the cylinder 97', by which, it is possible to prevent the position of the replacement hook 95' from being displaced along the y-z plane.

Further, in this embodiment, the position maintaining cylinder mechanism 130 is actuated by making use of the fluid supplied from the second fluid supply section 112 in order to determine the jig 46 tightly contacts the pallet 80' and the fluid supplied from the first fluid supply section 110 to actuate the cylinder 63. According to this configuration, the number of components of the machining system 10 can be reduced.

Figure 19:
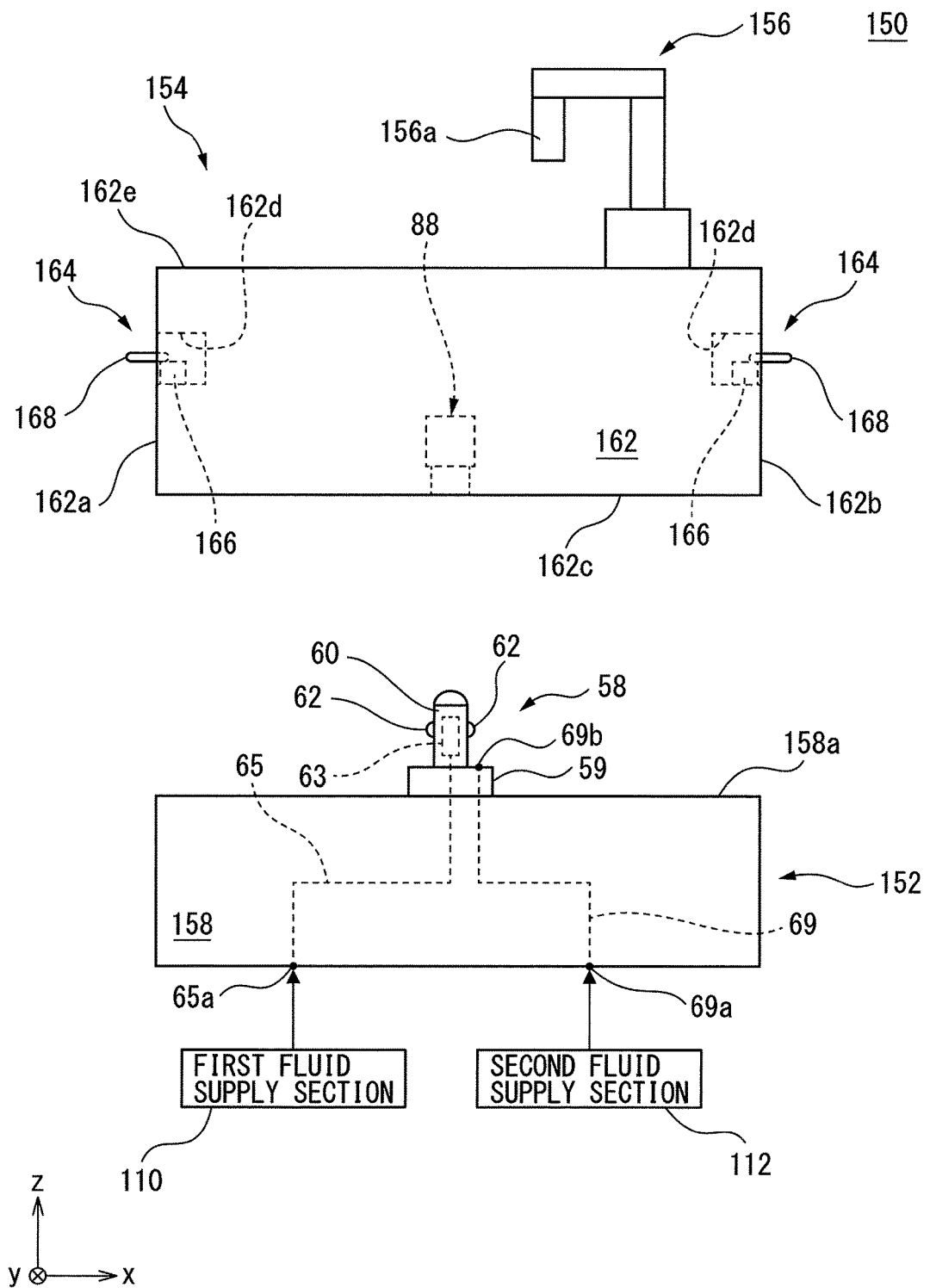
FIG. 19 is a view of a pallet device according to another embodiment.

Next, the pallet device 150 according to still another embodiment will be described with reference to FIGS. 19 and 20. The pallet device 150 can be applied to the above-mentioned machining system 10 in place of the pallet device 40.

The pallet device 150 includes a jig 152, a pallet 154, and a workpiece holding cylinder mechanism 156. The jig 152 includes a jig main body 158, and the pallet clamp 58 formed on a top surface 158a of the jig main body 158. The fluid paths 65 and 69 are formed in the jig main body 158.

As in the above-described embodiment, a fluid is supplied from the first fluid supply section 110 of the machine tool 14 into the fluid path 65 so as to actuate the cylinder 63 of the pallet clamp 58. Further, in order to determine the mount state between the jig 152 and the pallet 154, a fluid is supplied from the second fluid supply section 112 of the machine tool 14 into the fluid path 69.

The pallet 154 includes a pallet main body 162 and a total of four hook devices 164. The pallet main body 162 is formed with the hole 88 so as to be recessed inward from a bottom face 162c of the pallet main body 162, wherein the shaft 60 of the pallet clamp 58 is slidably inserted into the hole 88.

Two hook devices 164 are arranged at a left end face 162a of the pallet main body 162 so as to be separated from each other in the y-axis direction. Further, two hook devices 164 are arranged at a right end face 162b of the pallet main body 162 so as to be separated from each other in the y-axis direction.

As illustrated in FIG. 20, each hook device 164 includes a motor 166 and a replacement hook 168. The motor 166 is an electric motor, and accommodated in a hole 162d formed in the pallet main body 162. The replacement hook 168 is fixed to an output shaft of the motor 166. The motor 166 rotates the replacement hook 168 about a rotation axis parallel to the z-axis, in accordance with a command from the machine tool controller 42.

In FIG. 20, the replacement hook 168 indicated by a solid line is arranged at a projection position $P_1$. On the other hand, the replacement hook 168 indicated by a dotted line in FIG. 20 is arranged at a retraction position $P_2$.

The replacement hook 168 is moved between the projection position $P_1$ and the retraction position $P_2$ by the motor 166. Thus, in this embodiment, the motor 166 functions as a driving section configured to drive the replacement hook 168.

The workpiece holding cylinder mechanism 156 moves a clamp 156a in the z-axis direction in accordance with a command from the machine tool controller 42, so as to clamp a workpiece between the clamp 156a and a top surface 162e of the pallet main body 162.

The machining system 10 including the pallet device 150 according to this embodiment carries out the flows illustrated in FIGS. 13 and 16. More specifically, at step S2, the robot controller 18 grips the pallet 154 by the robot hand 22.

At this time, the replacement hook 168 is arranged at the projection position $P_1$. In addition, the replacement hooks 168 of the two hook devices 164 provided at the left end face 162a of the pallet main body 162 are received in the respective through holes formed at the distal ends of fingertips 32 of the robot hand 22.

Further, the replacement hooks 168 of the two hook devices 164 provided on the right end face 162b of the pallet main body 162 are received in the respective through holes formed at the distal ends of fingertips 36 of the robot hand 22. In this way, the pallet 154 is gripped and transported by the robot hand 22.

At step S3, the pallet 154 is placed upward of the jig 152, and at step S4, the pallet 154 is moved downward so that the shaft 60 of the pallet clamp 58 is inserted into the hole 88.

At step S7, the machine tool controller 42 sends a command to the motor 166 so as to actuate the motor 166 to move the replacement hook 168 from the projection position $P_1$ to the retraction position $P_2$.

According to this embodiment, when transporting the pallet 154 by the robot 16, the replacement hooks 168 can be arranged at the projection positions $P_1$ in order for the robot hand 22 to grip them.

On the other hand, when machining a workpiece, the replacement hooks 168 can be arranged at the retraction positions $P_2$, thereby, it is possible to prevent the workpiece or the tool 39a mounted on the spindle 39 from interfering with the replacement hooks 168 during workpiece machining.

Note that, in place of the robot 16, a loader may be applied to attach and detach pallets 80 and 82 to and from jigs 46 and 72. In this case, the loader includes the robot hand 22.

Further, the position maintaining cylinder mechanism 130, the fluid paths 114' and 132, the solenoid valve 134, and the fluid delay circuit 136 illustrated in FIG. 17 may also be applied to the second pallet 82 illustrated in FIG. 11.

Further, an O-ring or a joint may be provided at the connection between the open ends 67b and 103a in order to prevent fluid leakage.

Further, the cylinder 97 may be omitted, and the operator may manually arrange the replacement hook 95 at the projection position. Alternatively, the biasing section 101 may be omitted, and the operator may manually arrange the replacement hook 95 at the retraction position. Further, the hook device 93 illustrated in FIG. 7 may be applied to the pallet 154 illustrated in FIG. 19, or the hook device 164 illustrated in FIG. 19 may be applied to the pallet 80 illustrated in FIG. 7.

Although the invention has been described above through embodiments of the invention, the above-described embodiments are not intended to limit the invention according to the claims. Although combinations of the features described in the embodiments of the invention may also fall within the technical scope of the invention, all the combinations of the features may not always be involved in solving the problem of the invention. It is obvious to those skilled in the art that various changes or modifications may be made to the above-described embodiments.

It should be noted that each type of processing such as operations, procedures, steps, processes, and stages in a device, a system, a program, and a method defined in the claims, the specification, and the drawings may be implemented in any order unless otherwise specified as, e.g., "before" or "prior to" or the output of preceding processing is used in subsequent processing. Even when an operation flow in the claims, the specification, and the drawings is described using, e.g., "first," "next," "then," or "subsequently" for the sake of convenience, this does not mean that the flow may be preferably performed in such a specific order.

The invention claimed is:

1. A pallet device of a machine tool, comprising:
    a pallet including:
        a pallet main body configured to clamp a workpiece; and
        a replacement hook movably provided at the pallet main body so as to advance from at least partially inside of the pallet main body to outside of the pallet main body and so as to retract from the outside of the pallet main body to at least partially inside of the pallet main body, the replacement hook being movable between:
            (1) a projection position where the replacement hook projects out from the pallet main body and
            (2) a retraction position where the replacement hook is retracted from the projection position to at least partially inside of the pallet main body;
    an automatically-controllable driving section embedded in the pallet main body, and configured to move the replacement hook to the projection position in accordance with a command from a controller; and
    a jig to and from which the pallet is attached and detached.

2. The pallet device according to claim 1, wherein the pallet further includes a biasing section configured to bias the replacement hook toward the retraction position.

3. The pallet device according to claim 1, wherein the driving section includes a cylinder configured to movably receive the replacement hook and move the replacement hook to the projection position by a pressure of a fluid supplied from a fluid supply section into the cylinder.

4. The pallet device according to claim 3, wherein the jig includes a pallet clamp configured to releasably clamp the pallet,
the pallet clamp including:
a shaft inserted into a hole formed at the pallet main body;
an engagement section provided at the shaft so as to be movable between:
(1) a second projection position where the engagement section projects out from the shaft and
(2) a second retraction position where the engagement section is accommodated in the shaft,
the engagement section engaging a wall surface of the hole so as to clamp the pallet when the shaft is inserted into the hole and the engagement section is arranged at the second projection position; and
a second cylinder configured to move the engagement section to the second retraction position by a pressure of a fluid supplied from the fluid supply section into the second cylinder.

5. The pallet device according to claim 3, further comprising a position maintaining section configured to maintain a position of the replacement hook after the replacement hook is arranged at the projection position,
wherein the position maintaining section includes a valve configured to restrict a fluid flow from the cylinder to the fluid supply section when the replacement hook is arranged at the projection position.

6. The pallet device according to claim 1, further comprising a position maintaining section configured to maintain a position of the replacement hook when the replacement hook is arranged at the projection position.

7. A pallet device of a machine tool, comprising:
a pallet including:
a pallet main body configured to clamp a workpiece; and
a replacement hook movably provided at the pallet main body, the replacement hook being movable between:
(1) a projection position where the replacement hook projects out from the pallet main body and
(2) a retraction position where the replacement hook is retracted from the projection position toward the pallet main body;
a jig to and from which the pallet is attached and detached; and
a position maintaining section configured to maintain a position of the replacement hook when the replacement hook is arranged at the projection position,
wherein the position maintaining section includes:
a movement restriction section movable between:
(1) an engagement position where the movement restriction section engages the replacement hook arranged at the projection position so as to restrict the movement of the replacement hook toward the retraction position and
(2) a disengagement position where the movement restriction section disengages from the replacement hook so as to allow the movement of the replacement hook toward the retraction position;
a second biasing section configured to bias the movement restriction section toward the disengagement position; and
a second driving section configured to move the movement restriction section to the engagement position.

8. A machine tool comprising a pallet device, the pallet device comprising:
a pallet including:
a pallet main body configured to clamp a workpiece; and
a replacement hook movably provided at the pallet main body so as to advance from at least partially inside of the pallet main body to outside of the pallet main body and so as to retract from the outside of the pallet main body to at least partially inside of the pallet main body, the replacement hook being movable between:
(1) a projection position where the replacement hook projects out from the pallet main body and
(2) a retraction position where the replacement hook is retracted from the projection position to at least partially inside of the pallet main body;
an automatically-controllable driving section embedded in the pallet main body, and configured to move the replacement hook to the projection position in accordance with a command from a controller; and
a jig to and from which the pallet is attached and detached.

9. A machining system comprising:
the machine tool according to claim 8; and
a machine configured to detach the pallet from the jig, the machine including a holding section configured to hold the replacement hook when the replacement hook is arranged at the projection position.

10. The machining system according to claim 9, wherein the machine is a robot or a loader.

* * * * *